United States Patent [19]
Schneider

[11] Patent Number: 5,115,888
[45] Date of Patent: May 26, 1992

[54] SELF-SERVE CHECKOUT SYSTEM

[76] Inventor: Howard Schneider, 149 Finchley Road, Montreal, Quebec, Canada, H3X 3A3

[21] Appl. No.: 650,167

[22] Filed: Feb. 4, 1991

[51] Int. Cl.⁵ .............................................. G06K 7/10
[52] U.S. Cl. ...................................... 186/61; 235/383
[58] Field of Search ............................ 186/52, 59, 61; 235/383; 358/108

[56] References Cited

U.S. PATENT DOCUMENTS

| | | | |
|---|---|---|---|
| 4,145,715 | 3/1979 | Clever | 358/108 |
| 4,337,482 | 6/1982 | Coutta | 358/108 |
| 4,654,703 | 3/1987 | Viera | 358/108 |
| 4,656,344 | 4/1987 | Mergenthaler | 235/462 |
| 4,779,706 | 10/1988 | Mergenthaler | 186/61 |
| 4,787,467 | 11/1988 | Johnson | 177/50 |
| 4,792,018 | 12/1988 | Humble | 186/61 |
| 4,991,008 | 2/1991 | Nama | 358/108 |

Primary Examiner—F. J. Bartuska

[57] ABSTRACT

A self-serve checkout system which consists of a self-service checkout station containing a video camera unit which generally views a first scale where bar coded products are deposited and which pivots to view a second scale where products without bar coded labels are initially deposited. The video camera generates a signal received by a display in a supervisor station which allows a supervisory employee to approve non-bar coded products and to survey in general other products deposited on the first scale. A plurality of self-service checkout stations are selectively connected to a singular supervisor station by a switching unit. The self-service checkout stations contain angles or active surfaces to prevent deposition of articles for later fraudulent removal. The self-service checkout stations contain receipt printers, magnetic payment card readers and coupon acceptors to further reduce the time the supervisory employee must spend on each order.

17 Claims, 9 Drawing Sheets

SELF-SERVE CHECKOUT SYSTEM

FIELD OF THE INVENTION

The present invention relates to retail point-of-sale systems which allow the customer to check out purchased items with a minimum of operator intervention while preventing customer fraud.

BACKGROUND OF THE INVENTION

In Schneider, U.S. patent application Ser. No. 07/584,104—Automated Point-of-Sale Machine, herein referred to as the 'Schneider '104 invention', Schneider discloses a method and apparatus which allows consumers to check out their purchases with a minimal of direct human assistance. The Schneider '104 invention possesses significant improvements with respect to the prior art in the areas of customer fraud, shopping efficiency, non-coded products and use by non-experienced users. The Schneider '104 invention consists of two major modules—the self-service unit utilized by the customer, herein referred to as the 'robot module' and the unit utilized by the store employee to supervise the operations of several robot modules, herein referred to as the 'supervisor module'. The customer presents himself/herself at any available robot module with the items he/she has selected for purchase. The customer scans a product item and then places it into a bag resting on a scale, herein referred to as the 'packing scale'. The electronic signals from the scanner and the scale go to an electronic computer which contains (or can access) a product lookup table allowing the increase of weight on the packing scale to be verified against product number. The customer repeats this operation for all remaining items. If a weight change does not correspond with the product number then the customer will receive an audio and/or visual prompt to this effect from the robot module. Prompts typically are simultaneously transmitted to the supervisor module. A bidirectional intercom system allows the supervisory employee to immediately help the customer with any difficulties and if necessary, via the supervisor module keyboard, directly enter commands or product information. When the customer has scanned and bagged all items selected for purchase, the customer goes to the supervisor module to pay, or if the robot module is so equipped, as it would typically be in the case of debit or credit cards, the customer remains at the robot module for payment. In either case, the customer is instructed to leave the bag on the packing scale alone. Removing the bag from the packing scale will cause a change in weight (or similarly, adding a nonscanned item to the bag will cause a change in weight) that will be noticed by the computer and cause warning to be given. Only after the computer receives a signal that payment has been received will it allow the bag from the packing scale to be removed without a warning prompt occurring. Note that the customer has handled each item only one time. The customer scans and then directly bags the item. The item nor the bag is not handled again until checkout is finished, thus allowing a high shopper efficiency. A small exception occurs if the customer has items too numerous to fit in the bag(s) on the packing scale in which case full bags are slid several inches to an adjacent larger 'storage' or 'bagging' scale where weight changes are monitored by the computer. Before the customer uses the robot module, he/she presses a button or switch indicating the level of experience he/she has with this type of automated point-of-sale machine. For 'beginner' customers, when they have an item not containing a machine readable bar code, as indicated by pressing a 'no bar code' button on the robot module, they will be instructed to place the item directly into the bag on the packing scale where its image is sent to the supervisor module. The supervisory employee receives a prompt to examine the image and to enter the product number or a corresponding abbreviation of the new item. In the case of the 'experienced' customer, the computer monitor of the robot module will present the customer with a menu selection in order for the customer to qualitatively identify the product and optionally identify its quantity. After identification, typically involving pressing a button corresponding to a choice on a sub-menu, the customer is instructed to place the item in the bag on the packing scale. An image of the bag's new contents along with the customer's identification are presented to the supervisory employee via the supervisor module for verification. In the case of both the 'beginner' and 'experienced' customers, the weight change on the packing scale is evaluated by the computer with reference to the product number ultimately chosen to see if the weight change is reasonable. If the weight increase differs by more than the allowed tolerance for that product, then the supervisory employee will receive a prompt to inspect the transmitted video image with more care. Note that with only a small investment of the supervisory employee's time and with little confusion to the inexperienced user, that a product not bearing a machine readable code is accurately identified. In particular, note that the customer is not obligated to key in a series of product number digits to identify the product.

Although the Schneider '104 invention possesses many improvements with respect to the prior art, the present invention improves upon the Schneider '104 invention further. In the Schneider '104 invention it is occasionally difficult for the supervisory employee to distinguish produce items placed into the bag on the packing scale for identification among the other products already present in said bag. The present invention discloses a method and apparatus to increase both the speed and the accuracy of such identifications required of the supervisory employee. The existence of flat, non-active surfaces, in particular the surface adjacent to the scanner, where customers can leave non-scanned items for later fraudulent retrieval, gives customers the opportunity, albeit a small one, for theft. The present invention discloses a method and apparatus to eliminate even this small opportunity for theft. In the Schneider '104 invention the supervisory employee must spend a certain amount of time giving customers receipts and a certain amount of time taking coupons from customers. The present invention discloses a method and apparatus to reduce such time requirements of the supervisory employee. In the Schneider '104 invention each checkout station requires a set of video and camera monitors at the supervisor module. If the supervisory employee is to supervise 6 or 8 robot modules (i.e., checkout stations), then the supervisory employee would possibly have to view 16 monitors. The present invention discloses a method and apparatus whereby the supervisory employee need only supervise one set of typically two monitors.

SUMMARY OF THE INVENTION

The present invention describes a method and apparatus which allows consumers to check out their purchases with a minimal of direct human assistance and which further improves the Schneider '104 invention. The present invention is based on the Schneider '104 invention and reference should be made to the latter. The present invention discloses selective means which allow a video camera to view the contents of the bag on the packing scale or to view produce items requiring approval placed in a produce area. Thus, any produce or other items requiring specific video approval will be clearly seen by the supervisory employee free from interference of other purchased articles. The preferred embodiment of the present invention incorporates a pivoting camera above the robot module which pivots so as to view the bagging scale, the contents of the bag on the packing scale or to view produce items requiring approval placed in the produce area.

As is disclosed in more detail below, the present invention contains a produce area, a surface where produce items or other items without 'valid' bar coded labels are temporarily deposited. By the lack of a 'valid' bar coded label it is herein meant that either the product has no bar coded label, that the product has a defective bar coded label or that the product has a readable bar coded label but one that produces a product code for which product lookup table, where product codes are indexed with associated information about the particular product, indicates that specific video approval is required. In the preferred embodiment of the present invention the pivoting camera pivots away from the packing scale to view this surface so as to give the supervisory employee a clear image of the non-bar coded items. It is useful to place a scale underneath the produce area so that the weight of the products which the supervisory employee visually approves can be verified against the increase in weight on the packing scale when these products are subsequently transferred to the packing scale. Although not an essential feature of the present invention, the preferred embodiment of the present invention synergistically incorporates a legal scale (i.e., a scale approved for legal sales transactions) beneath the bar code scanner and eliminates the flat area adjacent to the bar code scanner which existed in the Schneider '104 invention. As such no flat, nonactive surfaces remain (i.e., all surfaces are angled away from the horizontal or contain weight sensing means) where customers can place non-scanned articles for later fraudulent retrieval. As such, the produce area viewed by the pivoting camera is considered the surface of the bar code scanner and customers can conveniently place produce items on top of the bar code scanner for visual approval via the pivoting camera as well as immediate weighing. An advantage of immediate weighing, as discussed above, is that the weight of the visually approved articles are known and that this exact weight is expected to be then deposited into the bag on the packing scale. If the customer fraudulently tries to add another item into the bag on the packing scale during this transfer, such additional weight (or other weight changes) will be noted. Another advantage of immediate weighing of produce items is that since the weight of the produce does not have to be tared from the other items in the packing bag, governmental regulatory approval of the present invention will be easier to obtain in certain localities.

A preferred embodiment of the present invention can be summarized as comprising: (a) a first stationary structural member intended for checkout use by a customer; (b) bar code reader means and first scale means mounted in said first stationary structural member such that said bar code reader means does not make contact with the active elements of said first scale means but that said bar code reader means is mounted less than one meter away from said first scale means; (c) said bar code reader means generating a first signal indicative of the product code of a product whose bar coded label has been read by said bar code reader means; (d) bag holding means mounted upon said first scale means; (e) said first scale means generating a second signal indicative of the weight present on said first scale means; (f) first user input means mounted in said first stationary structural member generating a third signal indicative of the particular first user input means device selected; (g) second scale means mounted in said first stationary structural member such that the top exposed surface of said second scale means defines an area where customers will temporarily deposit products without valid bar coded labels and where said second scale means generates a fourth signal indicative of the weight thereon; (h) video sensor means mounted in a video sensor movement means above said first scale means and above said second scale means where said video sensor movement means can selectively move said video sensor means so as to view an image of the top exposed surface of the said second scale means or to view an image of the surface of the said first scale means; (i) said video sensor means generating a fifth signal indicative of the image said video sensor means is currently viewing; (j) first user display means mounted in said first stationary structural member; (k) a second stationary structural member intended for supervisory use by a supervisory employee; (l) second user display means mounted in said second stationary structural member where said second user display means receives said fifth signal and said second user display means displays an image corresponding to said fifth signal; (m) second user input means mounted in said second stationary structural member generating a sixth signal indicative of the particular second user input means device selected; (n) controller means receiving via data communications means said first, second, third, fourth and sixth signals; (o) said controller means sending a first controller signal to said first user display means where said first user display means displays an image corresponding to said first controller signal; (p) said controller means sending a second controller signal to a third user display means where said third user display means displays an image corresponding to said second controller signal and where said third user display means is mounted in the said second stationary structural member; (q) said controller means sending a third controller signal to said video sensor movement means where said video sensor movement means moves the said video sensor means corresponding to the said third controller signal; (r) product lookup table means attached to said controller means; (s) said controller means upon receiving the first signal from said bar code reader means, sending a signal indicative of the first signal to said product lookup table and receiving in return a stored weight signal from said product lookup table indicative of the weight of the product whose bar code has just been read by said bar code reader means where said controller means compares the said stored weight signal with the increase in the second signal, indicative of the increase in weight on the said first scale means, being received from the said first scale means and where there is no valid correspondence between said stored weight signal and the increase in the second signal, said controller means sends a first controller signal to said first user display means advising the user of the lack of such valid correspondence; and (t) said controller means upon receiving the third signal from the said first user input means indicative of a product without a valid bar code, sending a third controller signal to said video sensor movement means such that said video sensor movement means moves the said video sensor means such that the said video sensor means views the surface of the said second scale means and thus the image of the surface of the said second scale means is indicated by the fifth signal and is thus displayed on the said second user display means, and sending a second controller signal to the said third user display means, and upon receiving a valid sixth signal from the said second user input means sends a first controller signal to said first user display means advising the user to transfer the contents on the said second scale means to the said first scale means and then verifies that the increase in weight indicated by the increase in the second signal is equal to the previous value of the fourth signal indicating the weight previously on the said second scale means. The numbering of signals is done in an arbitrary fashion and done to allow a concise description of the preferred embodiment of the present invention. As one skilled in the art is aware, many means exist to generate and transmit signals, a common means being electric voltage differences transmitted on wires. As well, as one skilled in the art is aware, many means exist for the representation of data, common means being digital binary representation of alphanumeric information and analog representation of sound and video information. Above, the 'increase' or 'decrease' in a signal's value, e.g., the comparison of the said stored weight signal and the increase in the second signal, should be taken such that an 'increase' in a given signal implies a larger numeric value for the value for which that signal is representing. Depending on the means chosen for representation of the data, however, an actual increase in the amplitude of the signal may not occur. In the description of the preferred embodiments of the present invention below, a more detailed disclosure of the present invention is provided. However, the 'first stationary structural member' is typically the checkout station used by the customer while the 'second stationary structural member' is typically the supervisor's station used by the supervisory employee. The 'bar code reader means' is typically a laser bar code scanner. The 'first scale means' is typically the packing scale, i.e., the scale where a bag is held in place by various attachment means and where after scanning a purchased product the customer then deposits the purchased product. The location of the 'bar code reader means' with reference to the 'first scale means' is important so as to allow customers scan and bag products in a single motion. The 'first user input means' is typically a collection of switches which the customer can use to indicate various conditions such as no bar code on a product, such as the termination of an order, such as requesting human assistance, etc. The 'second scale means' in the preferred embodiment of the present invention is the 'legal scale' described above, mounted in this preferred embodiment underneath the laser bar code scanner. Thus, the top exposed surface of the second scale means in this preferred embodiment of the present invention is effectively the surface of the laser bar code scanner. When a customer has a product without a valid bar code, as is often the case with produce items, the customer enters, via the first user input means, a code on a menu identifying the product or simply presses a switch indicating a product without a bar code. In response, the camera pivots so as to provide the supervisory employee with a view of the laser bar code scanner so that the supervisory employee can clearly identify the products on the laser bar code scanner. The supervisory employee sees the image of the products via a 'second user display means', typically a video display, and uses a 'second user input means', typically a keyboard, to typically approve (or enter product code if necessary) the product. The customer is then instructed on the 'first user display means', typically a video display, to transfer the products on the surface of the bar code scanner to the packing scale. The weight of the products, as previously measured by the legal scale ('second scale means') should closely correspond to the increase in weight on the packing scale ('first scale means') if the customer has not changed products or added an extra product during the transfer operation. The 'controller means' in the preferred embodiment of the present invention is a computer system comprising a CPU (central processing unit), RAM (randon-access-memory) hard disk drive storage and input/output ports. The program, i.e., the logical steps which control the actions of the CPU, are stored on the hard disk drive and are loaded into the RAM upon power-up. The product lookup table database, containing the list of product code, product descriptions, prices, taxes, expected weights, etc, is stored on the hard disk drive in the preferred embodiment of the present invention. As one skilled in the art is aware, in other embodiments, the location of the product lookup table may differ. As well, other embodiments may very well use a single centralized computer to control a number of checkout systems.

An atlernative embodiment of the present invention, whereby the selective means which allows a video camera to view the contents of the bag on the packing scale or to view produce items requiring approval incorporates a set of video cameras connected to a switching means, can be summarized as comprising: (a) a first stationary structural member intended for checkout use by a customer; (b) bar code reader means and first scale means mounted in said first stationary structural member such that said bar code reader means does not make contact with the active elements of said first scale means but that said bar code reader means is mounted less than one meter away from said first scale means; (c) said bar code reader means generating a first signal indicative of the product code of a product whose bar coded label has been read by said bar code reader means; (d) bag holding means mounted upon said first scale means; (e) said first scale means generating a second signal indicative of the weight present on said first scale means; (f) first user input means mounted in said first stationary structural member generating a third signal indicative of the particular first user input means device selected; (g) second scale means mounted in said first stationary structural member such that the top exposed surface of said second scale means defines an area where customers will temporarily deposit products without valid bar coded labels and where said second scale means generates a fourth signal indicative of the weight thereon; (h)

first video sensor means mounted above said first scale means where said first video sensor means views the products placed on the said first scale means and a second video sensor means mounted so that there is a direct visually unobstructed line from the said second video sensor means to the top exposed surface of the said second scale means where said second video sensor means views the products placed on the top exposed surface of said second scale means; (i) the output signals of said first video sensor means and said second video sensor means connected by signal communication means to a video switching means where said video switching means is selectively operable for transmitting a fifth signal indicative of the output signal of said first video sensor means or the output signal of said second video sensor means; (j) first user display means mounted in said first stationary structural member; (k) a second stationary structural member intended for supervisory use by a supervisory employee; (l) second user display means mounted in said second stationary structural member where said second user display means receives said fifth signal and said second user display means displays an image corresponding to said fifth signal; (m) second user input means mounted in said second stationary structural member generating a sixth signal indicative of the particular second user input means device selected; (n) controller means receiving via data communications means said first, third, fourth and sixth signals; (o) said controller means sending a first controller signal to said first user display means where said first user display means displays an image corresponding to said first controller signal; (p) said controller means sending a second controller signal to a third user display means where said third user display means displays an image corresponding to said second controller signal and where said third user display means is mounted in the said second stationary structural member; (q) said controller means sending a third controller signal to said video switching means where said video switching means transmits as indicated by the said third controller signal as the said fifth signal the output signal of the said first video sensor means or the output signal of the said second video sensor means; (r) product lookup table means attached to said controller means; (s) said controller means upon receiving the first signal from said bar code reader means, sending a signal indicative of the first signal to said product lookup table and receiving in return a stored weight signal from said product lookup table indicative of the weight of the product whose bar code has just been read by said bar code reader means where said controller means compares the said stored weight signal with the increase in the second signal, indicative of the increase in weight on the said first scale means, being received from the said first scale means and where there is no valid correspondence between said stored weight signal and the increase in the second signal, said controller means sends a first controller signal to said first user display means advising the user of the lack of such valid correspondence; and (t) said controller means upon receiving the third signal from the said first user input means indicative of a product without a valid bar code, sending a third controller signal to said video switching means such that said fifth signal is indicative of the image of the surface of the said second scale means and is thus displayed on the said second user display means, and sending a second controller signal to the said third user display means, and upon receiving a valid sixth signal from the said second user input means sends a first controller signal to said first user display means advising the user to transfer the contents on the said second scale means to the said first scale means and then verifies that the increase in weight indicated by the increase in the second signal is equal to the previous value of the fourth signal indicating the weight previously on the said second scale means. This summary of an alternative embodiment of the present invention is very similar to the summary of the preferred embodiment of the present invention presented above. However, this alternative embodiment of the present invention discloses a 'first video sensor means mounted above the said first scale means' and a 'second video sensor means mounted so that there is a direct visually unobstructed line from the said second video sensor means to the top exposed surface of said second scale means'. Typically, a first video camera would be mounted directly above the packing scale so as to provide a clear potential image of the contents within a bag present on the packing scale. It is necessary for this first video camera to be mounted more or less directly above the packing scale since if it was mounted at a significant angle to the packing scale the walls of the bag would block a clear image of the contents of the bag. Typically, a second video camera would be mounted adjacent to the top exposed surface of the legal scale (which in this embodiment, as in the preferred embodiment, may very well be the surface of the laser bar code scanner if the laser bar code scanner rests on the legal scale) or would be typically mounted above the top exposed surface of the legal scale. The angle at which the second video camera is mounted with respect to the produce area, i.e., the top exposed surface of the second scale means, is not very constrained since there are no bag walls to obstruct the image. In this alternative embodiment the third controller signal is received by a 'video switching means', i.e., typically an electronically controlled switch which conects either the first or the second video camera's signal to the output signal wire. Thus, in this alternative embodiment, instead of the third controller signal causing mechanical movement of a single video sensor or the light gathering apparatus of that single video sensor, the third controller signal selects between two video cameras which respectively will show an image of the packing scale or the produce area.

The present invention optionally incorporates within the checkout station (referred to as the 'robot module' in the Schneider '104 invention) a receipt printer and a coupon acceptor. Thus, the supervisory employee's time is saved in giving customers receipts and in accepting coupons.

The present invention optionally incorporates means to control a number of 'access switches'. Instead of containing as in the Schneider '104 invention, for example in the case where 6 checkout stations are being supervised by one supervisor station, 6 camera displays, 6 computer video displays, 6 cash drawers, 6 keypads, 6 speakers and 6 microphones, in the present invention the supervisor station contains only one camera display, one computer video display, one cash drawer, one kepypad, one speaker and one microphone. However, this camera display, this computer video display, this cash drawer, this keypad, this speaker and this microphone is electronically connected to the corresponding elements of the 6 checkout stations through access switches. The access means decides to which checkout station to connect the camera display, computer video

DESCRIPTION OF THE PREFERRED EMBODIMENTS

Figure 1:
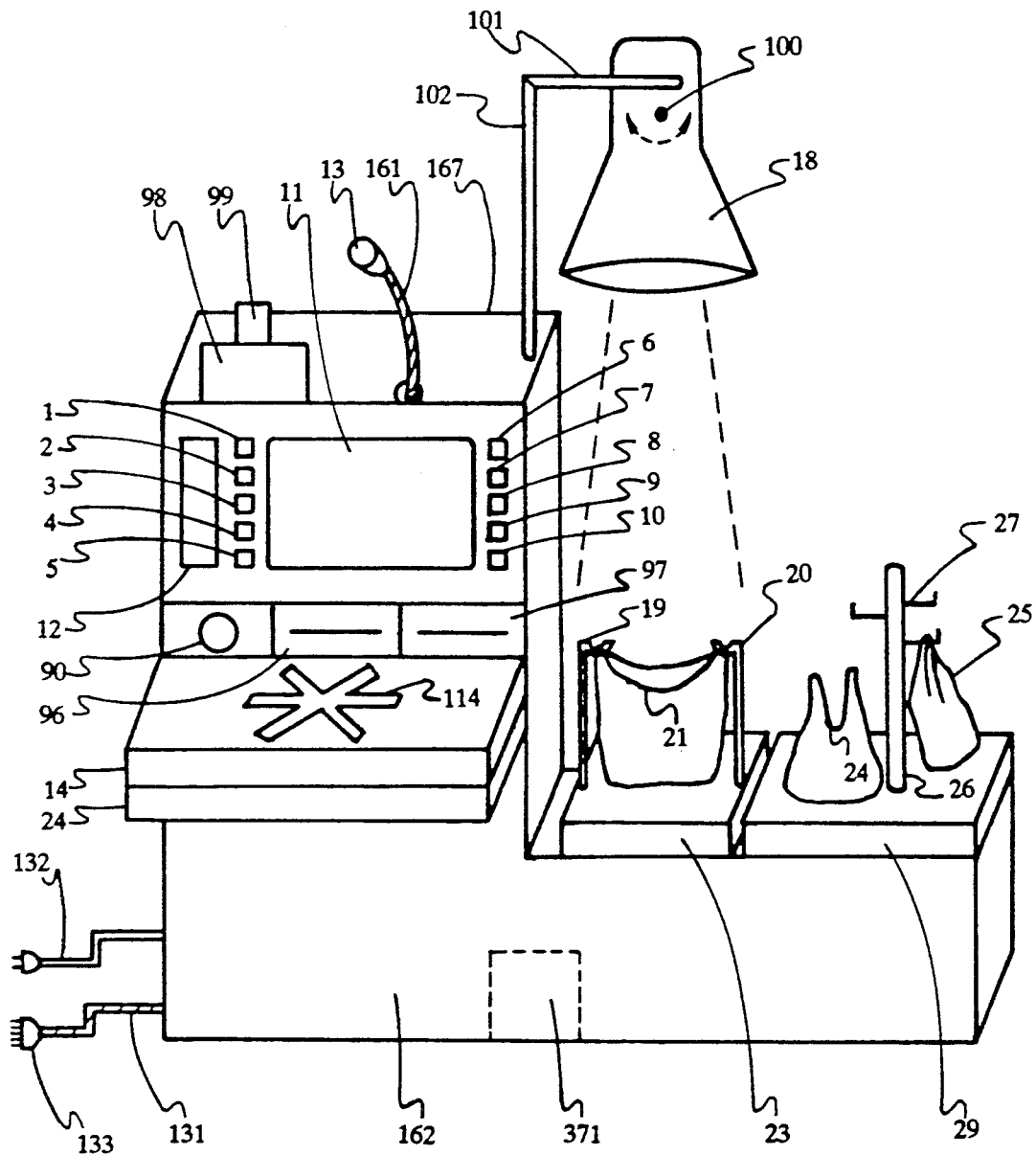
FIG. 1 is a perspective view showing the exterior configuration of a preferred embodiment of the 'checkout station' portion of the invention.

The present invention is based on the Schneider '104 invention and reference should be made to the latter. A preferred embodiment of a checkout station (previously referred to as 'robot module' in the Schneider '104 invention) is shown in FIG. 1. Customers scan their purchased products, one at a time, over aperture 114 of laser beam bar code scanner 14 and then place the scanned product into bag 21 held by bag supports 19 and 20 on packing scale 23. Note that bar code scanner 14 and that packing scale 23 do not make contact (if contact was made with the active weight measuring elements of packing scale 23 then the weight measurements of packing scale 23 could be in error) but that they are relatively close together, typically only several centimeters apart, never more than one meter apart. The proximal arrangement of the bar code scanner 14 and the packing scale 23 allows the customer in a single motion to scan a product and then deposit it in the bag 21 on packing scale 23. The computer within electronic circuitry enclosure 371 makes sure that the weight corresponding with the product code just scanned as given by a product code lookup table, is approximately equal to the weight signal coming from scale 23. If the stored weight does not correspond with the measured weight then the computer of the checkout station will prompt the customer via video display 11 and speaker 12 to remove the product(s) placed in the bag 21 and to rescan the product or else ask the supervisory employee for assistance.

Figure 2:
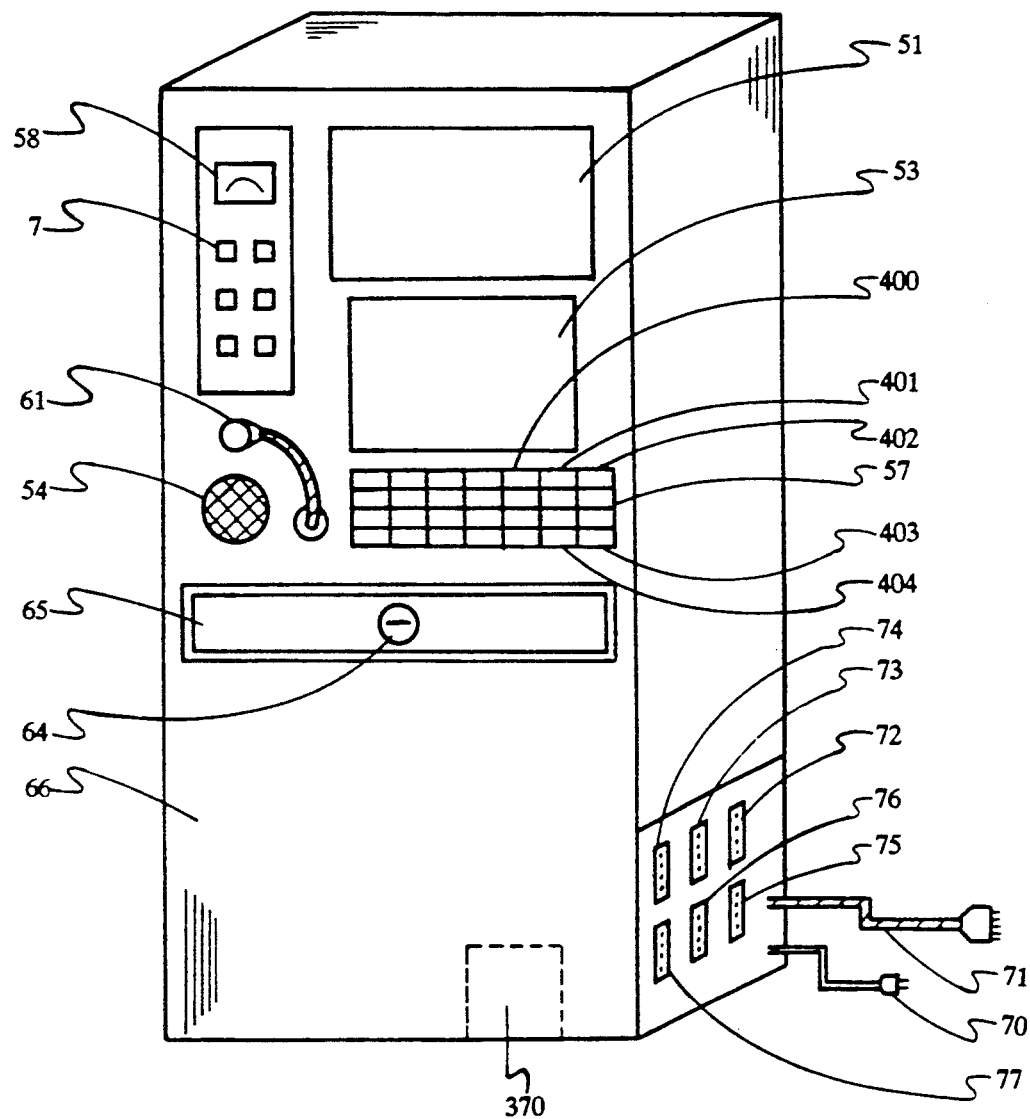
FIG. 2 is a perspective view showing the exterior configuration of a preferred embodiment of the 'supervisor station' of the invention.

If the customer has a product without a bar code, typically a produce item, then the customer places the product on the surface of scanner 14 and presses the NO BAR CODE button 2. The camera within camera unit 18 will automatically pivot about axis 100 so as to view the products placed on the surface of scanner 14. The weight of the product placed on scanner 14 will be sent to the computer of the checkout station via scale 24. Scale 24 will be referred herein as legal scale 24 since weight measurements required in a legal sense for determining the price of a product to be sold by weight will be obtained from legal scale 24. FIG. 2 is a perspective view of a preferred embodiment of a supervisor station (previously referred to as a 'supervisor module' in the Schnieder '104 invention). The supervisory employee will see a clear image on camera display 51 of the produce items placed on the surface of the scanner 14. Assuming that this is a beginner customer, the supervisory employee will enter the appropriate product code for the visualized products via supervisor keypad 57. (If this was an advanced customer then the customer would have identified, and quantified if the case so required it, the product via a series of menus and submenus by pressing buttons 1 to 10 as required. In such a case the supervisory employee would only have to accept or reject the customer's identification and possible quantification of the produce in question.) The computer of the checkout station then prompts via the video display 11 and the speaker 12 the customer to transfer the produce items to the bag 21. The computer will make sure that the weight given by the legal scale 24 is the same weight increase given by the packing scale 23 so as to make sure that no items have been fraudulently placed in the bag 21.

The pivoting camera unit 18 will then typically pivot back to provide a view of the contents of bag 21.

The pivoting camera unit 18 will then typically pivot back to provide a view of the contents of bag 21. In the embodiment shown in FIG. 1, the camera within camera unit 18 pivots on axis 100. Camera unit 18 is supported by arm 101 on pole 102 which connects to the remainder of the checkout station. It is easy to conceive of an alternative embodiment of the present invention whereby the whole camera unit 18 pivots instead of just the camera within. It is also easy to conceive of other embodiments utilizing different placement of camera unit 18. One simple such embodiment would be the utilization of a stationary camera behind window 90, thus allowing a clear view of the produce area which in this embodiment in on top of the scanner 14. Such an embodiment, even with the utilization of mirrors mounted above bag supports 19 and 20, would not truly allow a clear view of the contents of bag 21. This may not be a critical issue for certain embodiments. However, in the preferred embodiment of the present invention it is useful during the idle periods of the supervisory employee for the supervisory employee to see what are the contents of the bag on the packing scale 23 and to compare these contents with a list of the latest items scanned. For example, certain soft drink cans may have the exact weight (and shape for those embodiments where shape or dimensions are sensed). A customer may buy 9 expensive soft drink cans and 1 cheap soft drink cans. The customer can scan the cheap soft drink can 9 times while depositing an expensive soft drink can into the bag 21. However, if the supervisory employee periodically looks at the contents of the bag 21 on the packing scale 23, then such a fraudulent scheme would be occasionally be detected, and more importantly, if customer knew that such a scheme could be detected then psychologically they would be much less likely to attempt such a scheme in the first place. (In the future, when it is possible to replace the visual recognition functions of the supervisory employee with a visual recognition circuit, it will likewise be necessary for the visual recognition circuit to receive an image of the contents of bag 21 to prevent similar fraudalent activity.) If the camera unit 18 is mounted in a different fashion which is readily conceivable in still another alternative embodiment then note that the visual image of the contents of bag 21 will occur at an angle and will thus be less than ideal due to the obstruction of the side walls of bag 21. As the price of electronics drops, it may be economically possible in the future to eliminate the need for a pivoting camera unit 18 by placing at a minimum one camera behind window 90 to give an image of the produce area and another camera above bag 21 to give a clear image of the contents of bag 21. The signal which in the preferred embodiment of the present invention is typically transmitted to the pivoting camera unit 18 instructing the camera within the latter to pivot would in such an alternative embodiment be instead transmitted to a video switching device (typically located within electronic circuitry enclosure 371) which received the output signals of the video camera behind window 90 and the video camera above bag 21 and would instruct the video switching device to switch the output signal it transmitted from one camera to the other. Third and fourth cameras may still be respectively needed to survey the bagging scale 29 and to survey customer actions adjacent to scanner 14. Note that with the preferred embodiment shown in FIG. 1, the camera unit 18 provides a clear image of the contents of bag 21, a clear image of the contents of the produce area on top of the scanner 14, and that the camera can pivot still more to provide an image of the customer adjacent to scanner 14 as well as pivot in the opposite direction to provide an image of the bagging scale 29.

As mentioned above, the produce area is a surface where produce items or other items without 'valid' bar coded labels are temporarily deposited. By the lack of a 'valid' bar coded label it is was meant that either the product has no bar coded label, that the product has a defective bar coded label or that the produce has a readable bar coded label but one that produces a product code for which product lookup table, where product codes are indexed with associated information about the particular product, indicates that specific video approval is required. Products without valid bar coded labels will typically be produce items containing no bar coded label at all. For such products, customers will typically press the NO BAR CODE button 2, as described above. However, there may be other products that contain readable bar coded labels yet which require specific video approval. For example, a supermarket may incorporate dispensers of preprinted bar coded labels and dispensers of produce bags adjacent to produce items so that the customers would be expected to fix themselves the preprinted bar coded labels on the produce which they placed in the produce bags. To prevent customers from placing bar coded labels corresponding to cheap produce on produce bags containing expensive produce, it is necessary that the human supervisory employee perform a video approval. When such a preprinted bar coded label is read by laser beam bar code scanner 14, the computer within the checkout station will receive information from the product lookup table that the particular product requires a video approval. Similar actions will occur as when the customer pressed the NO BAR CODE button 2, as described above. The camera within camera unit 18 will automatically pivot about axis 100 so as to view the products placed on the surface of scanner 14. The weight of the product placed on scanner 14 will be sent to the computer of the checkout station via legal scale 24. The supervisory employee will see a clear image on camera display 51 of the produce items placed on the surface of the scanner 14. Since the bar coded label of this particular product has been read by the scanner 14 it is not necessary for either the customer or the supervisory employee to enter the product code. The supervisory employee need simply accept or reject the identification of the product. The computer of the checkout station then typically prompts via the video display 11 and the speaker 12 the customer to transfer the produce items to the bag 21. The computer will make sure that the weight given by the legal scale 24 is the same weight increase given by the packing scale 23 so as to make sure that no items have been fraudulently placed in the bag 21.

As described in the Schneider '104 invention, when the bag 21 on the packing scale 23 is filled, the customer can press the CHANGE BAG button 1. After doing so, the computer will prompt the customer to slide the bag 21 to the right onto bagging scale 29 and to place a new bag on bag holders 19 and 20. The computer will make sure that the weight increase of the bagging scale 29 is equal exactly to the weight of bag 21 measured by the packing scale 23. Note that bagging scale 29 contains post 26 with hooks 27 to hold a large number of filled bags, such as bag 25 hanging there. Or bags can be left on the surface of the bagging scale 29 such as bag 24. In the present invention, when the customer is transferring a bag from the packing scale 23 to the bagging scale 29, camera unit 18 will pivot towards the bagging scale 29 to allow the supervisory employee a visual inspection of the operations occurring. Such visual inspection could be shown briefly to the supervisory employee should the supervisory employee have free time, i.e., to make sure that nothing amiss is occurring. Such visual inspection would be required should the customer press the HELP button 5 for assistance, which causes the supervisory employee to receive an appropriate prompt, typically via computer video display 53. (Buttons 1 to 10 are located around video display 11 so that video display 11 can often display legends corresponding to specific buttons.) Note that the customer can speak with the supervisory employee via microphone 13 mounted on gooseneck 161 and can receive audio messages from the supervisory employee via speaker 12. Similarly the supervisory employee can speak with the customer via microphone 61 and can receive audio messages from the customer via speaker 54.

To reduce the amount of time that the supervisory employee must spend with the customer, the preferred embodiment of the present invention as shown in FIGS. 1 includes magnetic card reader 97, coupon acceptor 96 and receipt printer 98. In the preferred embodiment of the present invention, after each item is scanned or otherwise entered into the computer of the checkout station and then deposited into typically the bag 21 on the packing scale 23, the computer of the checkout station (located within the electronic circuitry enclosure 371) cause printer 98 to print a line on receipt 99 for that product. As well, the computer of the checkout station keeps an internal total and may display this current total value of the order on display 11. In other embodiments of the present invention, the receipt 99 may only be printed after completion and payment for the order. However, in the preferred embodiment, by printing each line after an article is scanned or otherwise entered into the computer of the checkout station, time is saved by avoiding these printing operations at order termination. If a customer uses a credit card or a debit card, appropriately magnetically encoded so as to be read by magnetic card reader 97, then after the computer of the checkout station has internally approved, or approved after communications with an exterior database, the card, a payment receipt can be also be printed by receipt printer 98. Coupon acceptor 96 is a electromechanical apparatus which is controlled by the computer of the checkout station and which sends a signal to the computer of the checkout station indicative of the coupon code of the coupon. The computer of the checkout station will make sure that the appropriate products have been purchased before giving th credit value of the given coupon. Coupon and bill acceptors are well known in the prior art, in particular with reference to accepting envelopes in automatic teller machines and with reference to identifying and accepting currency in automatic currency to change machines.

Note that the checkout station shown in FIG. 1 contains no passive, flat surfaces. The checkout station consists physically of cabinet 162. Cabinet 162 contains within electronic circuitry enclosure 371 which contains the computer and other electronic circuits utilized by the checkout station. Electronic circuitry enclosure 371 can be accessed by a door panel on the rear of the cabinet 162. Packing scale 23 and bagging scale 29 rest on the lowest section of cabinet 162. The other end of cabinet 162 is higher and is roofed by slanting roof triangle 167. The vertical and slanting panels prevent customers from depositing non-scanned products for later fraudulent retrievel after the computer and the supervisory employee assume that the order is paid for and the customer at this point is to collect his/her bags from the packing scale 23 and the bagging scale 29 and then leave the store. Scanner 14 and corresponding legal scale 24 project from cabinet 162 at approximately waist level. Power cable 132 is intended to plug into a standard electrical outlet and supplies power to the electronic circuits within cabinet 162. Communication cable 131 terminating in cable head 133 plugs into (directly or via an extension cable) cable sockets 72, 73, 74, 75, 76 or 77 of the supervisor station shown in FIG. 2.

FIG. 2 is a perspective view of the exterior configuration of the supervisor station. The supervisor station shown in FIG. 2 is intended to supervise up to 6 checkout stations, hence the availability of 6 cable sockets 72, 73, 74, 75, 76, and 77. Communication cable 71 is intended for communciation between any one of the checkout stations and an exterior database or a centralized computer sytem. Communication discussed herein is electronic in nature and involves signals travelling through a wire-based transmission means, although one skilled in the art knows that equivalent data (and voice and visual) communication is possible via fiberoptics and other means of wireless transmission.

The supervisor staion physically consists of cabinet 66. Electronic circuitry enclosure 370 contains the various electronic circuits required by the supervisor station and is accessible from a door panel on the rear. Power cable 70 plugs into a standard electrical outlet and provides the supervisor station with power for its various electrical circuits. Cash drawer 65 is mounted within cabinet 66. Cash drawer 65 can be opened if a key is inserted into lock 64, or if its internal electronic latch 82 is electronically activated.

Camera display 51 allows the supervisory employee a visual inspection of the field viewed by camera unit 18 of the checkout station. Computer video display 53 allows the computer of the checkout station to send messages to the supervisory employee. In the preferred embodiment the contents of the supervisor's video display 53 are identical to the contents of the checkout station's video display 11, although it is easy to conceive of small changes in the software which would create alternative embodiments where the supervisor's video display 53 received certain information which the checkout station's video display 11 did not. In the preferred embodiment of the present invention, each checkout station contains its own computer. Access switches, physically located in the electronic circuitry enclosure 370 of the supervisor station in the preferred embodiment but which could be located at each of the checkout station in an alternative embodiment, attach the video display 53, the supervisor keypad 57 and the cash drawer's 65 internal latch 82 to the computer of a given checkout station. At the same time the microphone 61 and the speaker 54 are attached to that particular checkout station's speaker 12 and microphone 13.

Access unit keyed 7 allows the supervisory employee to select a particular checkout station to which to be attached to via the various access switches. However, the supervisor station will often be automatically attached to a certain checkout station if a visual inspection is required or if the customer requests assistance. The access unit display 58 shows which checkout station the supervisor station is currently attached to.

Buttons 400, 401, 402, 403 and 404 are particular buttons of supervisor keypad 57 which are described later.

Although the supervisor station as shown in FIG. 2 in the preferred embodiment of the present invention, contains only a single camera display 51, a single computer video display 53, a single supervisor keypad 57, a single speaker 54 and a single microphone 61, other embodiments of the present invention are readily conceivable where various of the elements are doubled or tripled. Such redundant design would allow continuous operation in the case of a breakdown of a given unit. Such redundant design could also be modified to allow two operators to use the supervisor station simultaneously to serve simultaneously two checkout stations.

Although the preferred embodiment of the present invention places a computer with each checkout station, other embodiments are readily conceivable where a single multi-tasking computer exists within the supervisor station. However, due to advances in electronics, it is probably cheaper to place a computer within each checkout station then to have one centralized computer requiring cabling to and from all the electrical elements in each checkout station. An alternative embodiment economically more justified would be to leave a computer within each checkout station, but to have a computer containing the inventory lookup table and the accounting database within the supervisor station. In the preferred embodiment of the present invention, it is assumed that the centralized database is actually exterior to the supervisor station, and it is proposed that a modem connecting to communications cable 71 connecting in turn to the centralized database be accessible by all computers in all the checkout stations for uploading and downloading new information as required.

The camera display 51 and the video display 53, as well as the video display 11, are standard commercially avaiable parts. Camera display 51, video display 53 as well as video display 11 can be thought of 'user displays' (i.e., where the 'user' is either the customer or the supervisory employee). Many embodiments for such user displays are well known in the art. However, due to advancements in electronics technology color video display CRT based monitors are now commercially available at competetive prices (with respect to the overall price of the checkout system) and would be used as the 'user displays' in the preferred embodiment of the present invention. At present superimposing the image of camera display 51 onto video display 53 is technically possible and such equipment is commercially available. Such an alternative embodiment of the present invention would make the supervisory employee's tasks somewhat easier in having to view only one video monitor instead of two. However, due to economical consideration, the preferred embodiment of the present invention includes a separate camera display 51 and a separate video display 53. Buttons 1-10, keypad 57 and access unit keypad 7 can likewise be thought of as 'user input means'. Many embodiments for such 'user input means' are well known in the art and range from voice activated switches to capacitative switches to crude toggle switches. In the preferred embodiment of the present invention it is proposed that buttons 1-10 be constructed out of durable membrane switches to reduce the risk of vandalism. In the preferred embodiment of the present invention it is proposed that supervisor keypad 57 be a standard personal computer keypad which is commercially available at very competitive prices. In the preferred embodiment of the present invention, since access unit keypad 7 is part of somewhat of a specialized circuit particular to the present invention, for ease of construction it is proposed that commercially available screw-in momentary contact switches be used to construct keypad 7.

Figure 3:
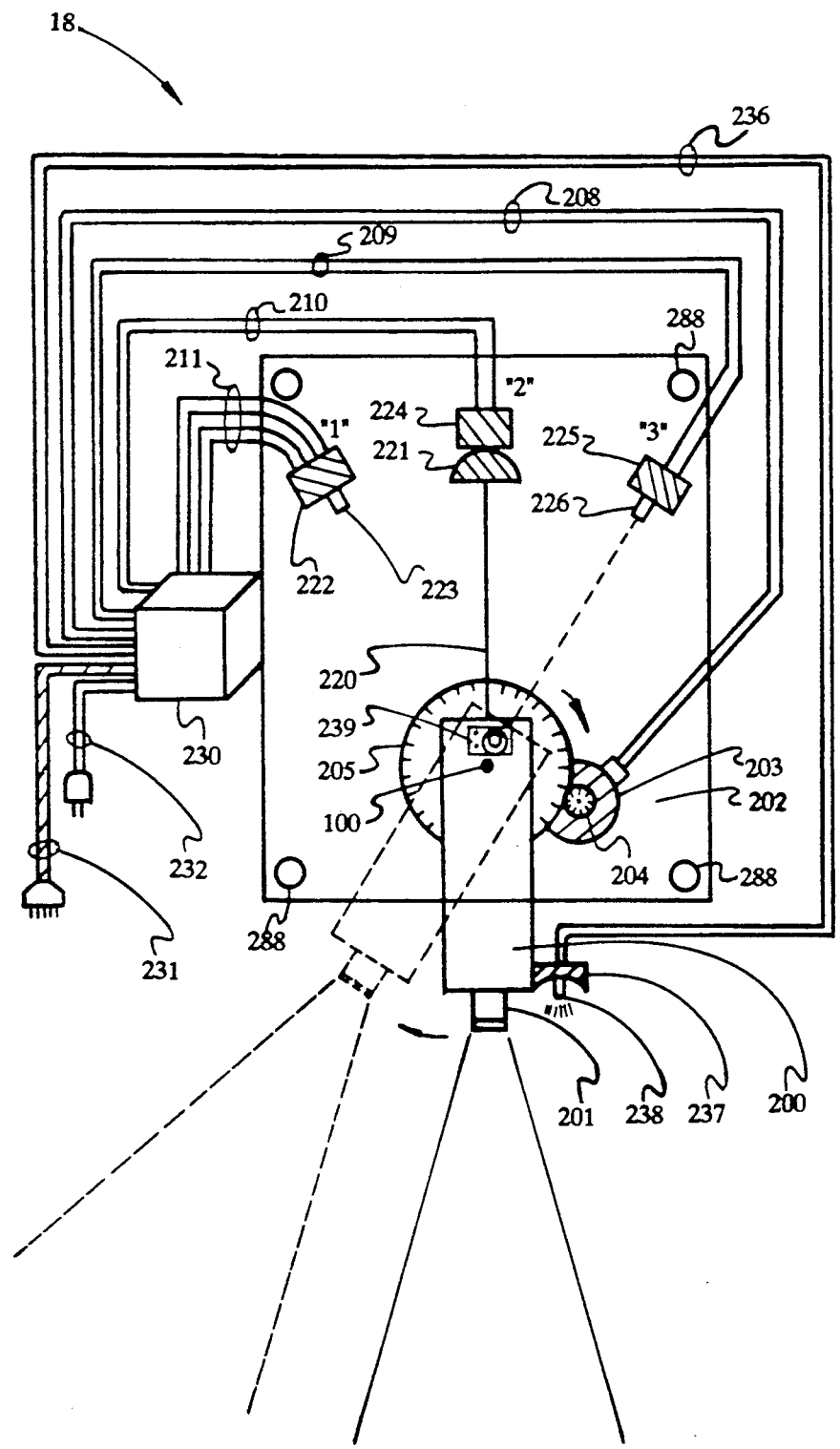
FIG. 3 is a perspective view of the interior configuration of a preferred embodiment of the pivoting camera unit incorporated in the checkout station shown in FIG. 1.

FIG. 3 is a perspective view of the interior configuration of a preferred embodiment of the pivoting camera unit 18 utilized in the checkout station shown in FIG. 1. Video camera 200 receives an image through lens unit 201. Lens unit 201 may be self-adjusting for distance. Such lens units are well known in the art and are inexpensive enough to have found widespread commercial use in consumer video cameras. However, if the distance from the camera 200 to the bag 21 is approximately equal to the distance from the camera 200 to the scanner 14 surface and approximately equal to the distance from the camera 200 to the bagging scale 29 so as to provide good quality images and if the quality of the images from within bag 21 does not change as items are placed in bag 21 and the highest item is thus closer to camera 200 than the previous low items, then a lens unit 201 may contain a fixed lens. Other lens units are conceivable for incorporation in alternative embodiments and are well known in the art where an adjustable power zoom exists, and where a different zoom ratio is used for the different positions to which camera unit 18 pivots to. The video camera 200 in the preferred embodiment is sensitive to color images and so generates a color video signal, available for connection to the appropriate video/interface cable at output jack 239. Other embodiments of the present invention, however, for economical reasons may use a black and white video camera. Video camera 200 typically compensates automatically for available illumination and color temperature, techniques which are well known in the art. Although many video cameras are capable of working adequately with only 10 lux or so of illumination, the clearest images are not registered unless the illumination is more than 300 lux (28 footcandles). Average illumination of retail environments is typically greater than 300 lux. However, the illumination within the bag 21 may nonetheless be significantly less than 300 lux. Thus, in the preferred embodiment of the present invention, as shown in FIG. 3, reflector 237 containing light bulb 238 receiving power from wire cable 236, is mounted adjacent to the video camera 200 to ensure adequate lighting. In the preferred embodiment of the present invention, light bulb 238 is constantly on, although it is readily conceivable that in an alternative embodiment of the present invention a switch turn light bulb 238 off when the existing illumination is sufficient.

In the preferred embodiment of the present invention, the camera 200 rotates about an axis 100 while the other components of the camera unit 18 remain stationary. The external configuration of the camera unit 18 is shown in FIG. 1. Since only the camera 200 rotates, it is necessary to house camera unit 18 in a housing having a wide opening to allow camera 200 to have a clear line of vision for all its required angles. To avoid a housing with such a wide opening, it is possible to conceive of an alternative embodiment of the present invention whereby arm 101 attaches around axis 100 and the whole camera unit 18 rotates about this axis. FIG. 3 shows the interior configuration of the camera unit 18. For the sake of clarity wire cables 208, 209, 210, 211, and 236 are shown looser than they would be in most embodiments of the present invention. Structural panel 202 provides a surface on which to mount the components of the camera unit 18. The external housing of the camera unit 18 mounts onto structural panel 202 via screw holes 288. Axis 100 is a rod firmly attached to camera 200 and to gear 205 but can rotate with respect to structural panel 202 via a bearing mounting beneath gear 205. A bearing mounting in the external housing of the opposite end of axis 100 allows axis 100 to rotate freely with respect to the external housing of the camera unit.

Reversible motor 203, powered by wire cable 208, drives gear 204 which in turn drives gear 205 which attaches to axis rod 100 and thus turns camera 200 which is also affixed to axis rod 100. Affixed to camera 200 is switch rod 220 ending in semi-circular termination 221. If camera 200 turns clockwise to the new position shown by the broken lines, then switch rod 220 will also change position causing semi-circular termination 221 to press on switch lever 226 of switch "3" 225. If the camera 200 had rotated enough in the opposite direction, then semi-circular termination 221 would have pressed upon switch lever 223 of switch "1" 222. Switch "1" 222, switch "2" 224 and switch "3" 225 are connected respectively by wire cables 211, 210 and 209 to camera unit circuitry enclosure 230. Camera unit circuitry enclosure 230 receives power from power cable 232 which is intended to plug into a power outlet within or outside the checkout station. Communication cable 231 goes from the camera unit circuitry enclosure 230 to the electronic circuitry enclosure 371 of the checkout station.

Figure 4:
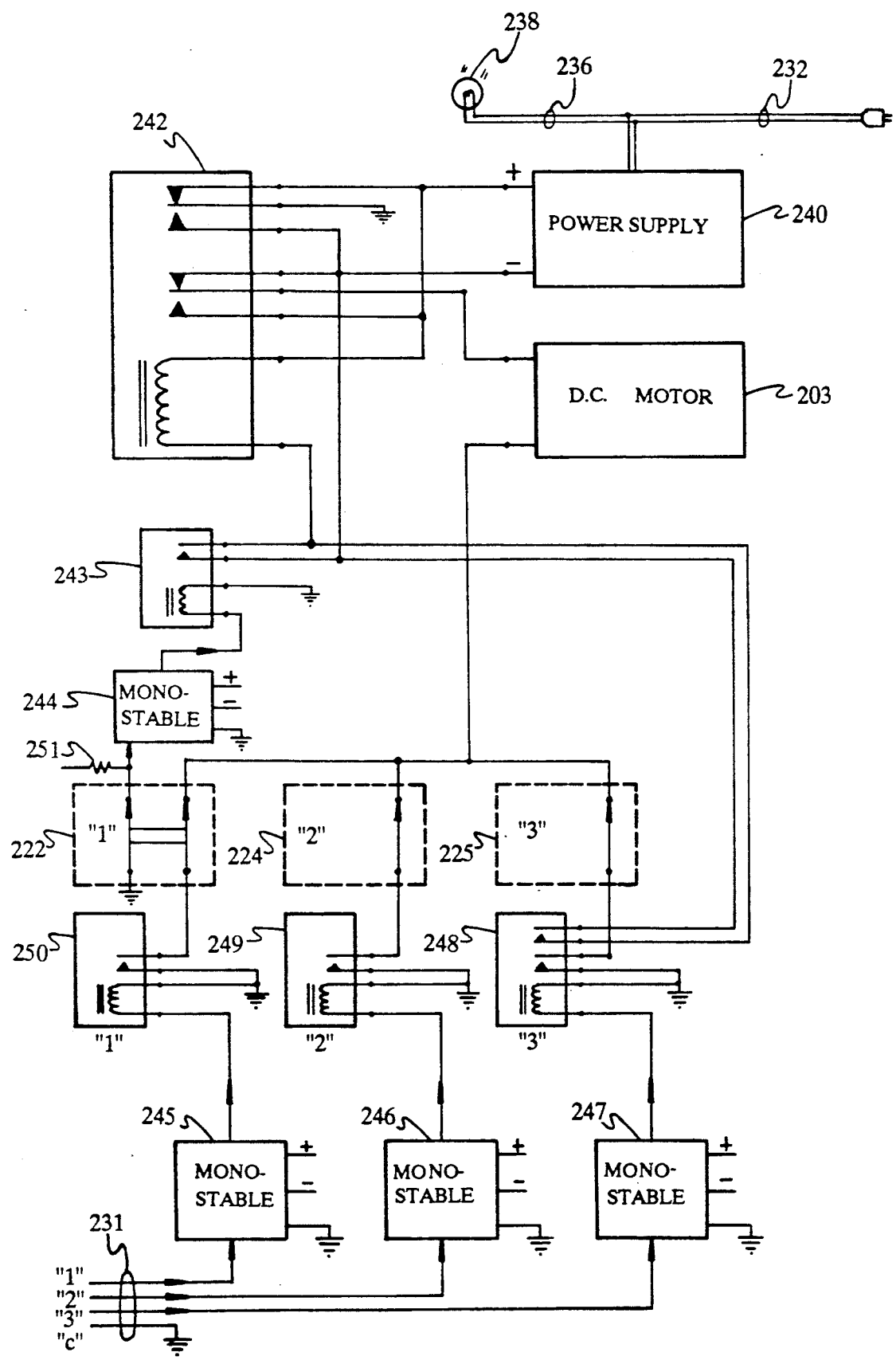
FIG. 4 is an electrical schematic diagram of the pivoting camera unit shown in FIG. 3.

FIG. 4 is an electrical schematic diagram of the electrical circuits required in the preferred embodiment of the present invention. The circuits utilized here are for the sake of clarity simple in nature. As one skilled in the art is aware, many other means of motion control capable of moving camera 200 to the desired position exist.

Relays 243, 248, 249 and 250 have contacts that are normally open, i.e., the coil of these relays must become energized before electrical contact occurs between the contacts of these relays. The contacts of relay 242 are as shown in the non-energized state. If the coil of relay 242 becomes energized then the common contacts make contact with the lower contacts. Switches 222, 224 and 225 are normally closed switches, i.e., when semi-circular termination 221 depresses the switch lever of one of these switches, then that particular switch becomes electrically opened. Power supply 240 supplies the required voltages for the circuits shown in FIG. 4, including the monostable circuits 245, 246, 247, and 244. Monostable circuits 245, 246, 247, and 244 upon receiving an appropriate input pulse, cause their output to go high for a predetermined time period, thus energizing the coil of the relay to which the output goes to for that predetermined time period. Light 238 does not receive power from power supply 240, but in this embodiment instead receives power directly from power line 232 entering the camera unit circuitry enclosure 230.

Consider the operation of the circuits shown in FIG. 4. Consider that camera 200 is in the position shown by the solid lines in FIG. 3. In such a case then switch "2" 224 would be opened. Switch "1" 222 and switch "3" 225 would be closed. However, no current would flow through DC motor 203 since the corresponding contacts in relay 250 and relay 248 are opened. Now considers what happens when a pulse on the "3" wire of cable 231 occurs. This pulse will cause monostable circuit 247 to energize relay 248 for a period of time long enough to have camera 200 move into its new position. The contacts of relay 248 close during this period of time. The upper contacts of relay 248 close causing relay 242 to become energized and thus cause the polarity of the power applied to motor 203 to allow motor 203 to cause the camera to turn clockwise. The bottom contacts of relay 248 close causing current flow through these contacts through switch "3" 225 and through motor 203. Thus the camera 200 turns clockwise. The camera 200 will continue turning clockwise until the semi-circular termination 221 presses against the switch lever 226 of switch "3" 225 causing switch 225 to become electrically open. At this point the current through motor 203 is interrupted and thus the clockwise motion of camera 200 stops. The output of monostable 247 shortly thereafter returns back to the normal state. Consider now that a pulse occurs on the "1" wire of cable 231. This pulse will cause monostable 245 to energize relay 250 causing current to flow through motor 203. The polarity of the current is such that camera 200 turns counterclockwise. Camera 200 continues to turn counterclockwise until it is in the position whereby semi-circular termination 221 presses against the switch lever 223 of switch "1" 222 causing switch 222 to electrically interrupt the current to motor 203. Consider now that a pulse occurs on the "2" wire of cable 231. This pulse will cause monostable 246 to energize relay 249 causing current to flow through motor 203. When switch "1" 222 is open, monostable 244 is triggered via the current flowing through resistor 251 thus energizing relay 243 and in turn energizing relay 242 and thus reversing the polarity of the current to motor 203 so that motor 203 now causes the camera to rotate clockwise. The closing of switch "1" 222 as the semicircular termination 221 releases switch lever 223 of switch "1" 222, will cause a pulse which will trigger monostable 244 again ensuring that relays 243 and 242 stay energized for time period of monostable 244 which is long enough for the motor 203 to move the semicircular termination 221 to the switch "2" 224 position as in this case or the switch "3" 225 position in other cases. When the semicircular termination 221 reaches the position of switch "2" 224, switch "2" 224 opens thereby stopping the motor and keeping the camera 200 in this position.

In the preferred embodiment of the present invention shown in FIGS. 1 and 3, camera 200 is allowed in three positions—viewing the produce area which is the surface of scanner 14, directly overhead the bag 21 on packing scale 23 and viewing the bagging scale 29. Alternative embodiments of the present invention are readily conceivable where additional positions are included. For example, by further clockwise rotation of camera 200, an image of the customer scanning items can be obtained. As well, alternative embodiments of the present invention are readily conceivable where rotation of camera 200 occurs along another axis. If camera 200 rotated along an axis frontwards, then an image of the floor in front of the cabinet 162 of the checkout station would result.

Figure 5:
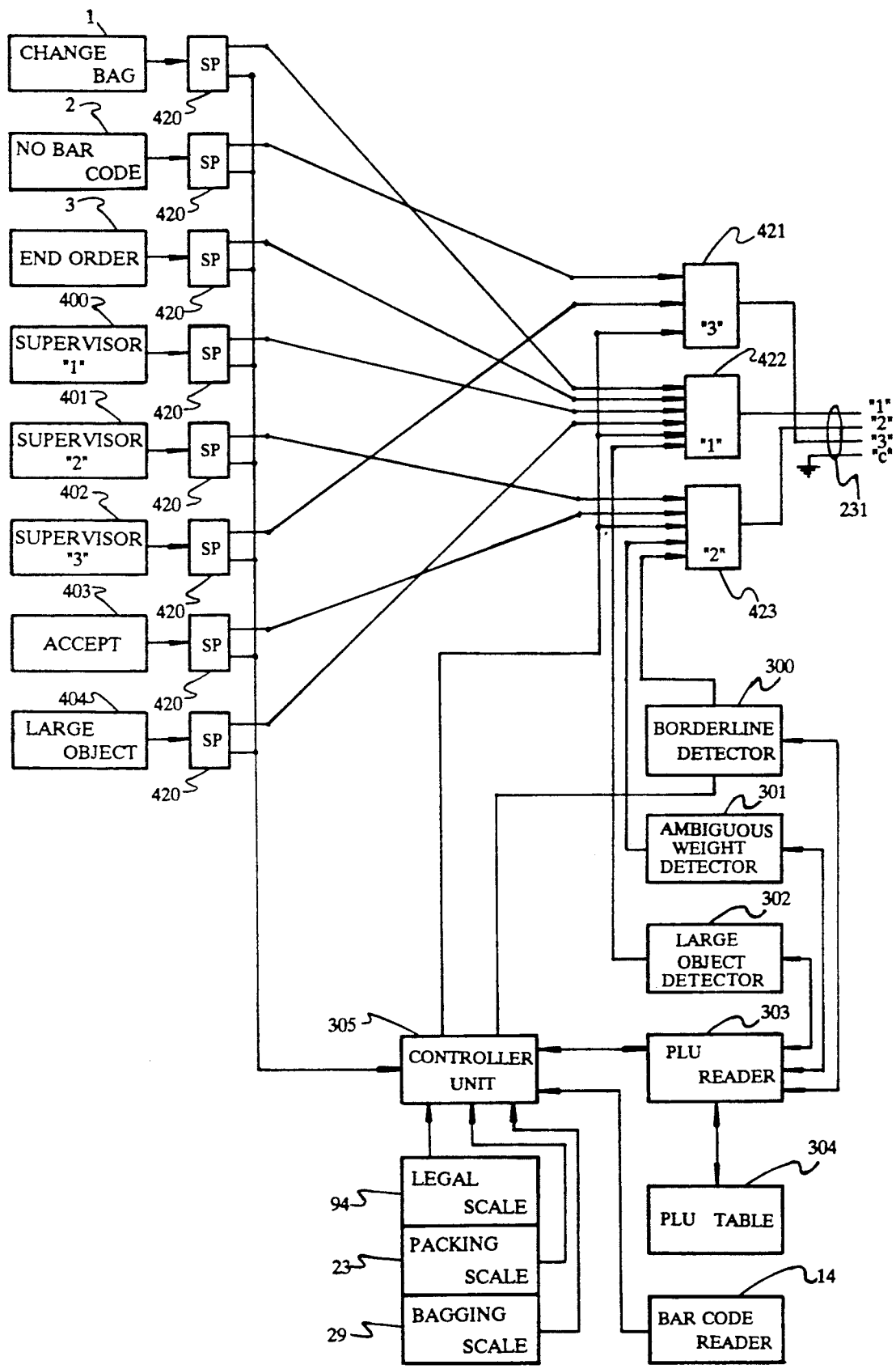
FIG. 5 is a functional diagram of the incorporation of the pivoting camera unit within the checkout station.

FIG. 5 is a functional diagram of the incorporation of the pivoting camera unit 18 within the system formed by the checkout station and the supervisor station of the present invention. It is desired that the camera 200 within the camera unit 18 will pivot to allow the supervisory employee the appropriate field of view. For example, when the customer presses the CHANGE BAG button 1, the signal from this button, via signal processor 420 (which exists to process the signal from every button 1 to 10 on the checkout station and every button of the supervisor keypad 57) to the camera "1" input/output circuit 422. The camera "1" input/output circuit 422 will then send a pulse on the "1" wire of the cable 231 leading to the camera unit 18. As described above, such a pulse will cause the camera 200 to rotate to the "1" position. Thus, if the supervisor station is attached to this checkout station, the image on camera display 51 will be a view of the bagging area. This is appropriate since the customer should be in the process of shifting a bag from the packing scale 23 to the bagging scale 29. On the other hand, if the customer presses the NO BAR CODE button 2, the camera "3" input/output circuit 421 will send a pulse on the "3" wire of cable 231 causing the camera 200 within camera unit 18 to rotate to the "3" position. Thus, if the supervisor station is attached to this checkout station, the image on camera display 51 will be a view of the surface of scanner 14 which in this embodiment is considered the produce area. Thus, the supervisory employee will have a clear visual image of the produce which the supervisory employee will be expected to approve. In the preferred embodiment of the present invention, the controller unit 305 will generally reset the camera back to the "2" position via the camera "2" input/output circuit 423. This is so that during idle times the supervisory employee will see the contents of the bag 21 on the packing scale 23 and can verify that nothing is amiss. As shown in FIG. 5, the supervisory employee can force the camera 200 to positions "1", "2" and "3" by respectively pressing buttons 400, 401 or 402 on the supervisor keypad 57. As shown in FIG. 5, after the supervisory employee has approved a visual identification by pressing the ACCEPT button 403, the camera 200 is returned to the "2" position. This is in keeping with the philosophy above of generally resetting the camera 200 vertically overhead the bag 21. If in the case of an oversize object which must directly be placed on the bagging scale 29, the supervisory employee has pressed the LARGE OBJECT button 404 on supervisor keypad 57, note that the camera 200 will rotate to the "1" position thus allowing an image of the bagging scale 29.

When the customer scans a product's bar code on bar code scanner 14, the product code given by the product's bar code label is sent to controller unit 305. Controller unit 305 sends this product code to the PLU (product lookup) table reader 303 which accesses the record in the PLU table 304 for that given product code. The record in the PLU table 304 for a given product code will typically include price, description, tax status, the expected weight(s) for the product, the weight range(s) considered acceptable, whether the product is considered oversize, and whether there are other products having similar weights as this product. If the large object detector 302 finds that the product is considered oversize or if the expected weight for that product is greater than a certain value, for example, 15 kgs, then the large object detector 302 causes the camera 200 to move to the "1" position. Since in such a case the customer will be prompted to place the product directly on the bagging scale 29, it is useful to have the camera 200 register an image of the bagging scale 29. If the ambiguous weight detector 301 finds that the product is considered to have an ambiguous weight (i.e., there are other products with the same weight) then the ambiguous weight detector 301 will cause the camera 200 to move to the "2" position if it isn't already in this position. Also, the controller unit 305 in such a case will send a prompt to the video display 53 of supervisor station and the access unit controller 460 of the supervisor station, as shown possible by the functional diagram of the checkout system shown in FIG. 6, so as to prompt the supervisory employee to make sure that the product placed in bag 21 corresponds with the product listed on video diplay 53. Since the camera 200 is in the "2" position, the image on the camera display 51 will be the contents of the bag 21. Similarly, if borderline detector 300 detects that the weight of the product placed in bag 21 is slightly greater than or slightly less than the expected range of weights, note that borderline detector 300 ensures that the camera 200 is in the "2" position so that in such case when the supervisory employee is prompted to make a visual check of the situation, the image on camera display 51 will be the contents of the bag 21.

In FIG. 5, the outputs of the various buttons via the signal processing units 420 and the outputs of the large object detector 302, the ambiguous weight detector 301 and the borderline detector 300 directly cause the camera 200 to move to the appropriate position. In other embodiments of the present invention, rather than have such direct control of the position of camera 200, the controller unit 305 would indirectly decide to move the position of camera 200 as required. For example, in such an embodiment, if the CHANGE BAG button 1 was pressed, the controller unit 305 would receive the signal and would logically (i.e., following logical program steps) decide to move the camera 200 to position "1". In the preferred embodiment of the present invention, the ambiguous weight detector 301, the large object detector 302 and the borderline detector 300 are discrete entities. The latter circuits are quite simple to build and involve a few gates wired together to perform various comparison operations. However, it is readily conceivable that in alternative embodiments of the present invention that the latter circuits would not discretely exist, but instead the controller unit 305 would logically make the equivalent comparisons. For example, instead of the ambiguous weight detector 301 noting that the PLU reader 303 has received the record for a given product number that indicates that the weight is ambiguous, in such an alternative embodiment, the controller unit, following a logical program, would check each time a record was received from the PLU reader 303 to see if the weight was ambiguous and should the information received from the PLU reader 303 indicate that in fact the weight was ambiguous, the controller unit 305 would send a signal to the camera unit circuitry enclosure 230. In more advanced alternative embodiments, in fact, the controller unit 305 would store in temporary memory the present location of the camera 200 and would send a signal to rotate camera 200 only if required.

Figure 6:
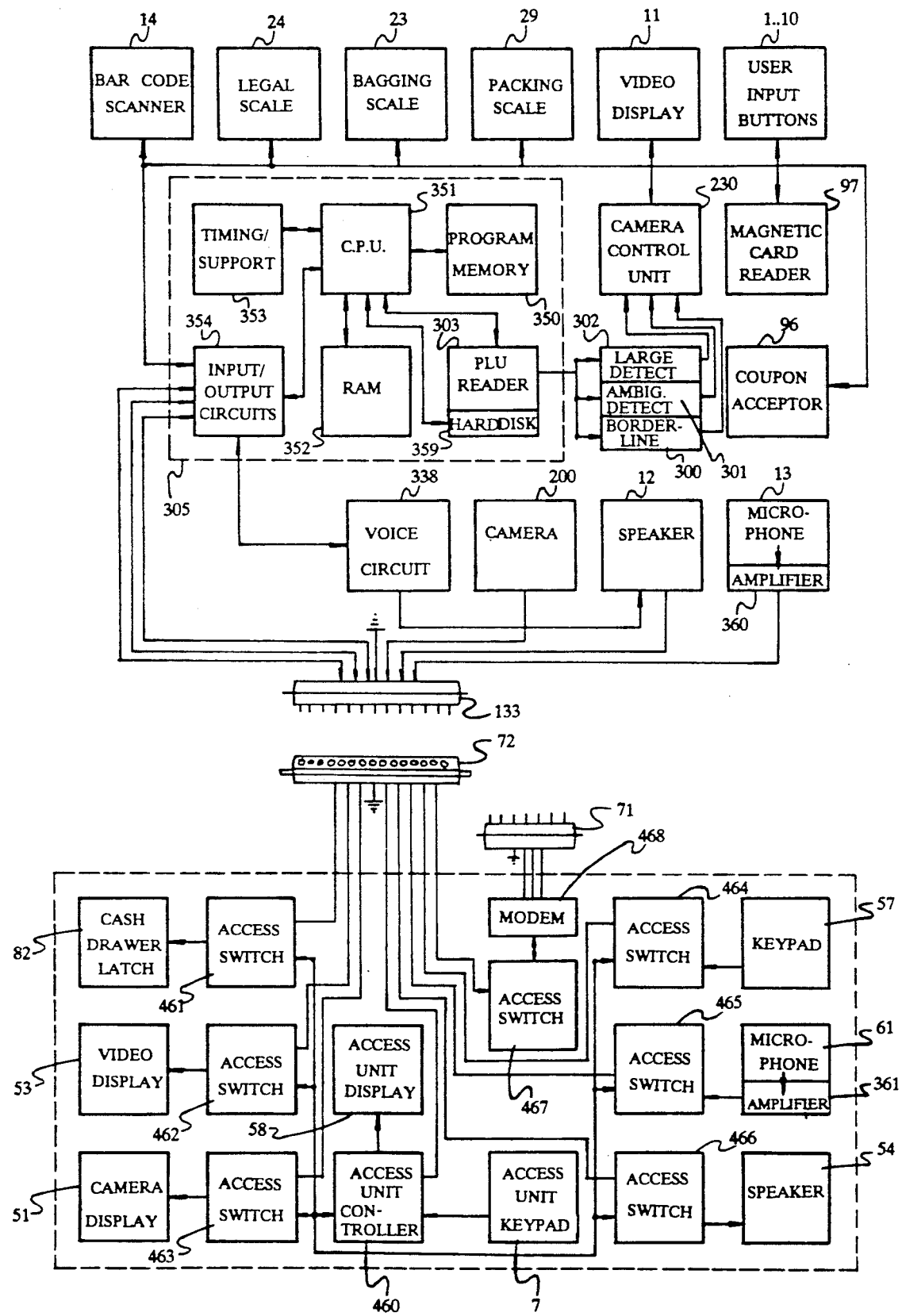
FIG. 6 is a functional diagram of a preferred embodiment of a checkout station and a supervisor station.

FIG. 6 is a more complete functional diagram of the checkout system disclosed by the preferred embodiment of the present invention. For the sake of clarity, FIG. 6 depicts a single checkout station attaching to a supervisor station. As such, only communications socket 72 is shown here. However, communications sockets 73, 74, 75, 76 and 77 would typically be present so as to allow the supervisor station to typically supervise six checkout stations. Each of communications sockets 73, 74, 75, 76 and 77 would be connected to the same access switches 461, 462, 463, 464, 465, 466 and 467 as communications socket 72 is shown connected to in FIG. 6, as well as connecting to the Access Unit Controller 460. As was mentioned earlier, in the preferred embodiment of the present invention, the access switches, i.e., the devices responsible for attaching the one set of input/output devices in the supervisor station with the computer and corresponding input/output devices of a given checkout station, are located in the supervisor station. However, alternative embodiments of the present invention are readily conceivable whereby said access switches exist within each checkout station and as such each checkout station can attach to a common bus which connects to the set of input/output devices in the supervisor station.

The circuits of the supervisor station in FIG. 6 are shown within the dotted lines on the lower half of the figure. The Access Unit Controller 460 controls the access switches so as to determine which communication socket, i.e., which checkout station, attaches to the set of input/output circuits in the supervisor station. The construction of such access switches are well known in the art. The access switches can be constructed out of relays or out of transistor switches, or in the future it will economically be feasible to perform all such switching in software by propagating certain signals and not propagating other signals. In the preferred embodiment of the present invention, all the access switches work in parallel, i.e., all of the input/output devices of the supervisor station are attached to a given checkout station. Other embodiments of the present invention are theoretically conceivable where certain input/output devices of the supervisor station are attached to one checkout station and other input/output devices of the same station are attached to another checkout station. However, the utility of such embodiments remains to be seen. Thus, the Access Unit Controller 460 sends a common signal to Access Switches 461, 462, 463, 464, 465, 466 and 467 where said signal causes these access switches to connect a particular communication socket, hence a particular checkout station, to the input/output devices of the supervisor station. If, for example, the Access Unit Controller 460 sent a signal to the access switches to connect communications socket 72 to the various input/output devices of the supervisor station, then the checkout station which plugged into communications socket 72 would now have its controller unit 305 connected to the cash drawer latch 82, to the video display 53, to supervisor keypad 57, to the modem 468 and corresponding communications cable 71 leading to exterior databases, while the camera 200 of that checkout station would display its image on camera display 51 and while microphone 61 via amplifier 361 would send the supervisory employee's voice to speaker 12 of that checkout station and while microphone 13 via amplifier 360 would send the customer's voice of that checkout station to speaker 54 of the supervisor station. The Access Unit Display 58 allows the supervisory employee to see which checkout station is currently connected to the supervisor station. The Access Unit Keypad 7 allows the supervisory employee to manually connect the supervisor station to any one of the six (in this embodiment) checkout stations. Access Unit Keypad 7, Access Unit Display 58 and Access Unit Controller 460 could in an alternative embodiment synergistically be incorporated within respectively the supervisor keypad 57, the video display 53, and the controller unit 305 of all the checkout stations. However, the relatively low cost of the components required to construct Access Unit Keypad 7, Access Unit Display 58 and Access Unit Controller 460 make it economically feasible to keep the latter circuits discrete as shown in the preferred embodiment of the present invention.

Although the supervisory employee can use Access Unit Keypad 7 to manually connect the supervisor station to a given checkout station, this will not happen often. In the preferred embodiment of the present invention, most of the switching of the different checkout stations for attachment to the supervisor station will occur automatically by the controller units 305 of the checkout stations. The Access Unit Controller 460 of the preferred embodiment uses a simple scheme whereby every time it receives a request from a checkout station or from the Access Unit Keypad 7 for attachment to a particular checkout station, it increments the number of requests received for that particular checkout station. When free to do so, the Access Unit Controller 460 checks to see which checkout station has received the most requests for attachment and then causes the access switches to attach to that particular checkout station.

Figure 7:
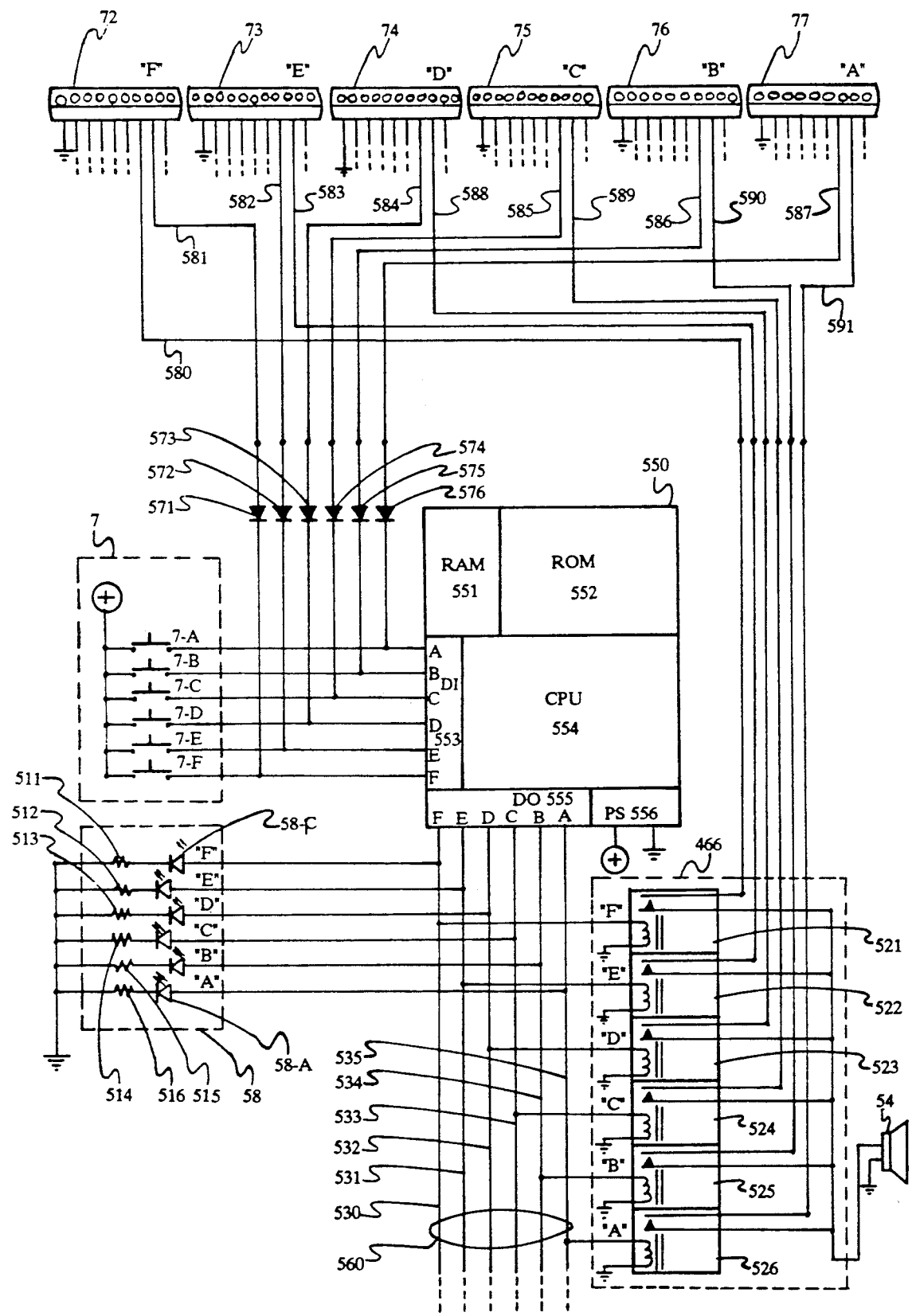
FIG. 7 is an electrical diagram of a preferred embodiment of the access unit controller, the access unit display, the access unit keypad and an access switch connecting the speaker of the supervisor station.

FIG. 7 is a more detailed functional diagram of a preferred embodiment of the access unit controller 460, the access unit display 58, the access unit keypad 7 and access switch 466 connecting the speaker 54 of the supervisor station. The access unit controller 460 consists essentially of microcomputer circuit 550 and diodes 571-576. Microcomputer circuit 550 is a readily available integrated circuit which consists of a CPU (central processing unit) 554 including the necessary support and timing circuits, a ROM (read-only-memory) 552 containing the program steps which CPU 554 follows, a RAM (random-access-memory) 551 containing a number of registers for temporary storage of data, power supply area 556, DI (digital inputs) 553 for receiving digital input signals and DO (digital outputs) 555 for transmitting digital output signals. Access unit keypad 7 consists of six momentary contact pushbutton switches 7-A-7-F with one side of the switches to the positive voltage supply and the other end attached to a corresponding DI 553 input circuit of microcomputer circuit 550. By pressing a pushbutton switch of keypad 7 a pulse is thus transmitted to a particular input circuit of DI 553. DI 553 may also receive digital pulses from any of the six checkout station's computers in this embodiment. For example, if checkout station "C" which plugs into communication socket 75 wants to request attachment to the supervisor station, it will send a pulse on wire 585 which will pass through diode 574 and be received by the "C" circuit of DI 553. Diodes 571 to 576 prevent the positive generated by the keypad 7 from being transmitted back to the checkout stations. CPU 554 follows the programs steps stored in ROM 552 and will typically cause one of the DO circuits to become active. Note that the access unit display 58 consists of six LED's (light-emitting-diodes) 58-A-58-F and their associated current limiting resistors 516-511, simply connected to the DO 555 circuits. The LED corresponding to the DO 555 circuit activated will be on.

The wires 530-535, forming bus 560, attached to the DO 555 circuits are sent to access switches 461, 462, 463, 464, 465, 466 and 467. For the sake of clarity only access switch 466 is shown here in FIG. 7. Access switch 466 attaches the amplified microphone output 360 of a particular checkout station with the speaker 54 of the supervisor station. Wires 581, 583, 588, 589, 590 and 591 respectively come from amplifier 360 of checkout stations "F", "E", "D", "C", "B" and "A". Relays 521-526 form the active components of access switch 466. Consider that access unit controller 460 desires to attach checkout station "C". In such a case DO 555 circuit C will be activated, thus causing in the preferred embodiment shown in FIG. 7 a positive voltage to appear on wire 533. Note that the positive voltage on wire 533 will cause relay 524 to become energized thus attaching wire 589, which comes from amplifier 360 of checkout station "C" to speaker 54.

Figure 8:
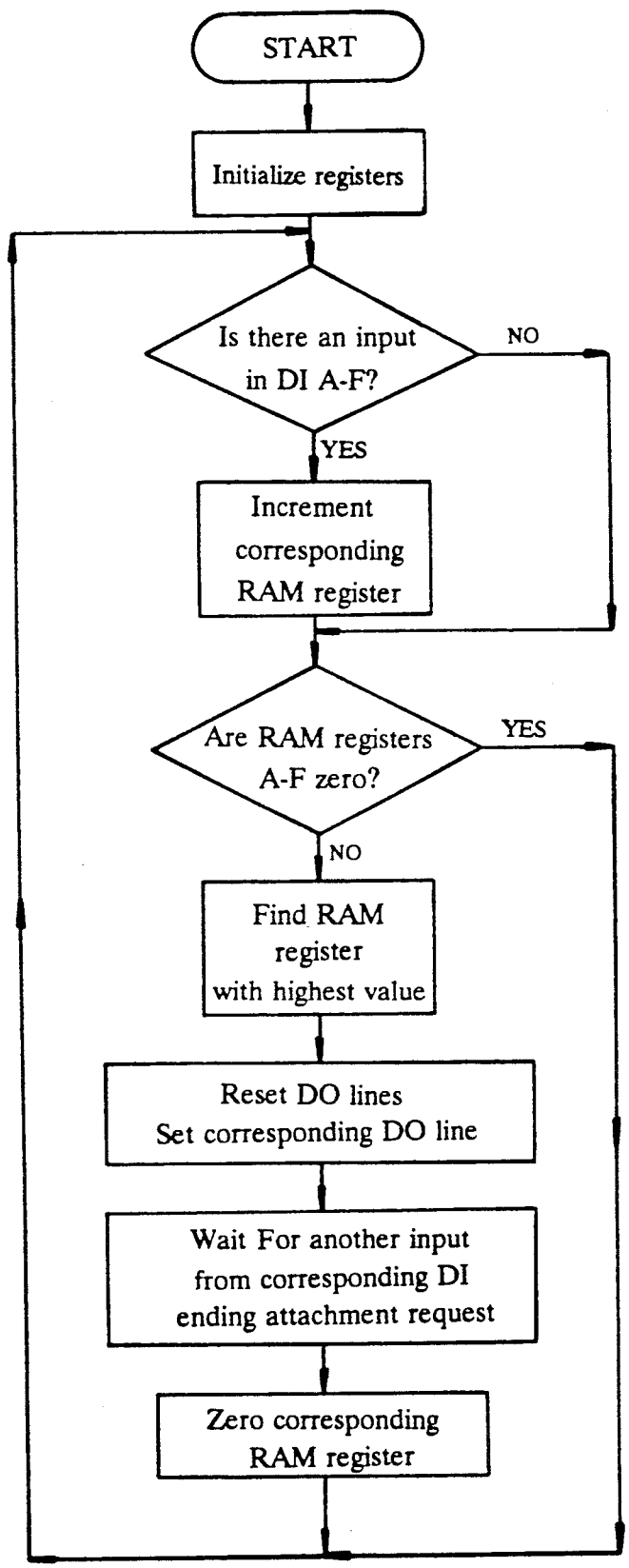
FIG. 8 is a logical diagram of the access unit controller.

FIG. 8 is a logical diagram of microcomputer circuit 550. When power is applied and the program (which is the logical steps stored in ROM 552) begins, the program causes CPU 554 to initialize all registers. The program considers six specific registers in RAM 551 of the typically hundreds of typically byte-wide registers in RAM 551 as corresponding to checkout stations "A"-"F". The CPU 554 checks the DI circuits 553. Have any pulses been received by any of these DI circuits? If for example, a pulse was received by the "C" DI 553 circuit, then the CPU 554 increments the value in the register in RAM 551 corresponding to the "C" checkout station. After checking all the DI circuits, the CPU 554 resets these circuits. The CPU 554 then checks the six registers in RAM 551 corresponding to checkout stations "A"-"F". If there is a non-zero value in at least one of these registers, then CPU 554 checks all of the registers to see which register has the highest value, i.e., which register has received the most corresponding pulses at the corresponding DI circuit. In the case of two or more registers containing equivalently highest values, then one register can be chosen at random. Consider the case where the register corresponding to the "C" checkout station has the highest value. In such a case the CPU 554 then resets the DO 555 circuits and then activates the DO 555 "C" circuit, thus causing a positive voltage to appear on wire 533 and thus appropriately causing the access switches to attach the input/output elements of the supervisor station with checkout station "C". The CPU 554 now surveys the DI 553 circuits. If input pulses for other checkout stations are received then during this time the CPU 554 can increment their corresponding registers in RAM 551. However, not until another pulse is received at DI 553 circuit "C" will the CPU 554 consider attaching the supervisor station's input/output elements to another checkout station. When such an 'end attachment request' pulse is received, CPU 554 erases the value in the register corresponding to checkout station "C" in the RAM 551 and the program starts over again. The checkout station having the corresponding register in RAM 551 with the greatest value will be the next checkout station attached to the supervisor station's input/output elements.

The Schneider '104 invention discloses the logical operation of a checkout station similar to the checkout station of the present invention. One main difference of the present invention with respect to the Schneider '104 invention is the existence of the pivoting camera 200 and camera unit circuitry enclosure 230. Although camera unit circuitry enclosure 230 could be driven entirely by logical operations solely via the controller unit 305, in the preferred embodiment of the present invention as shown in FIG. 5, the camera unit circuitry enclosure 230 is largely driven by discrete circuits, either directly in response to a certain user input button 1 to 10 being pressed or a certain button on the supervisor keypad 57 being pressed or the borderline detector 300, the ambiguous weight detector 301 or the large object detector 302 becoming activated. Thus the incorporation of the pivoting camera unit 18 in the present invention does not change the logical operations of the controller unit 305 greatly with respect to the previous Schneider '104 invention. Another difference of the present invention with respect to the previous Schneider '104 invention is the necessity of a checkout station to request to the access unit controller 460 of the supervisor station to attach the supervisor station to the particular checkout station. In the preferred embodiment of the present invention, such operations are done logically by the controller unit 305. However such logical operations are typically quite obvious and do not greatly change the logical operations of the controller unit 305 greatly with respect to the previous Schneider '104 invention. Essentially, whenever the controller unit 305 requires the supervisory employee to approve a product or when the customer requests assistance, the controller unit 305 sends a pulse to the access unit controller 460 and waits. During the waiting time, the controller unit 305 can perform whatever local tasks need to be done, for example, weighing a produce item. Various protocols can be logically constructed as whether to send additional pulses to the access unit controller 460 so as to increase priority for various situations as they may arise. Other protocols can be logically constructed (in the controller unit 305 or in the microcomputer circuit 550 of the access unit controller) so as to randomly request attachment to a random checkout station during idle times so as to survey that products corresponding with the bar codes scanned are actually being deposited into bag 21. Another difference in the present invention compared to the previous Schneider '104 invention, is the presence of a coupon acceptor 96. However, the previous Schneider '104 invention in discussion of the logical operations of the checkout station of that invention discloses a logical routine for coupon processing. In the previous Schneider '104 invention, such coupon processing largely involves the experienced customer choosing from a menu or a series of submenus the appropriate coupon choices and later giving the corresponding coupons to the cashier. It is an obvious task for one skilled in the art to modify this coupon processing logical routine so as to incorporate the operation of the coupon acceptor 96 which exists in the present invention.

The functional diagram of the checkout station of the present invention is shown on the top portion of FIG. 6. The controller unit 305 consists of a CPU 351 following logical steps which are stored in a program memory 350. The contents of program memory 350 are typically retrieved upon power-up from hard disk 359 which acts as a large capacity non-volatile storage bank. Timing/support circuits 353 are required for the operation of CPU 351 and other circuits of the controller unit 305. RAM 352 consists of a large number of temporary memory storage registers which CPU 351 can use to store intermediate results of various operations. PLU reader 303 is used to access the hard disk 359 with respect to product information typically indexed by product code. As was discussed above, in the preferred embodiment of the present invention, PLU reader 303 is attached to a large object detector 302, an ambiguous weight detector 301 and a borderline detector 300 where these latter circuits directly drive the camera unit circuitry enclosure 230. Often PLU reader 303 will consist of a large amount of RAM so as to allow very quick access of product information, with the contents of this RAM being derived from a non-volatile database stored on hard disk 359 or occasionally from a database exterior to the checkout station. Input/output circuits 354 allow the controller unit 305 to access the various other elements making up the checkout station as well as the elements of the supervisor station and as well as exterior databases via modem 468 of the supervisor station. Within the checkout station, input/output circuits 354 interface the controller unit 305 to the bar code scanner 14, the legal scale 24, the packing scale 23, the bagging scale 29, the video display 11, the user input buttons 1 to 10, the camera control unit (i.e., the camera unit circuitry enclosure) 230, the magnetic card reader 97, the coupon acceptor 96, and the voice circuit 338 which plays digitized and/or synthesized human voices on speaker 12.

Figure 9:
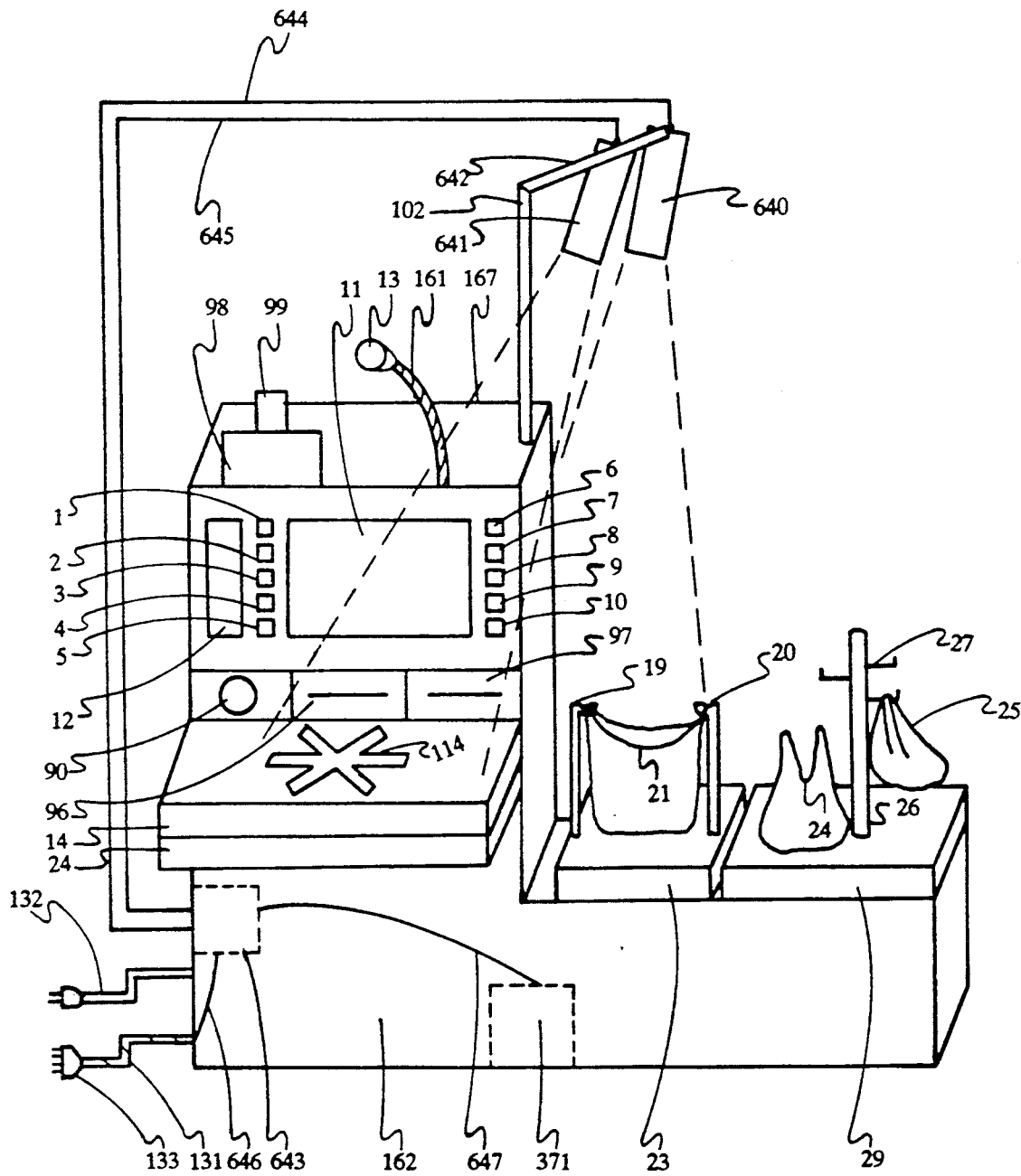
FIG. 9 is a perspective view showing the exterior configuration of an alternative embodiment of the 'checkout station' portion of the invention.

FIG. 9 is a perspective view showing the exterior configuration of an alternative embodiment of the 'checkout station' portion of the invention. This alternative embodiment has been discussed above and as noted this alternative embodiment of the present invention is very similar to the preferred embodiment of the present invention. First video camera 640 is mounted directly above the packing scale 23. Second video camera 641 is not mounted directly above the laser scanner 14 or the scale 24, but nonetheless provides, in this alternative embodiment, an unobstructed view thereof. First video camera 640 and second video camera 641 are supported by rod 642 joining to pole 102. The output of first video camera 640 and the second video camera 641 are respectively sent on cables 644 and 645 which join electronically controlled switch 643. Electronically controlled switch 643 connects either cable 644 or cable 645 to output cable 646 which joins cable 131 and then continues in the fashion of the preferred embodiment of the present invention. Electronically controlled switch 643 receives a control signal via cable 647 from the computer within electronic circuitry enclosure 371.

Those skilled in the art will be able to ascertain, using no more than routine experimentation, other equivalents for the method and apparatus above described. Such equivalents are to be included within the scope of the following claims.

I claim:

1. A self-service checkout system comprising:

(a) a first stationary structural member intended for checkout use by a customer;

(b) bar code reader means and first scale means mounted in said first stationary structural member such that said bar code reader means does not make contact with the active elements of said first scale means but that said bar code reader means is mounted less than one meter away from said first scale means;

(c) said bar code reader means generating a first signal indicative of the product code of a product whose bar coded label has been read by said bar code reader means;

(d) bag holding means mounted upon said first scale means;

(e) said first scale means generating a second signal indicative of the weight present on said first scale means;

(f) first user input means mounted in said first stationary structural member generating a third signal indicative of the particular first user input means device selected;

(g) second scale means mounted in said first stationary structural member such that the top exposed surface of said second scale means defines an area where customers will temporarily deposit products without valid bar coded labels and where said second scale means generates a fourth signal indicative of the weight thereon;

(h) video sensor means mounted in a video sensor movement means above said first scale means and above said second scale means where said video sensor movement means can selectively move said video sensor means so as to view an image of the top exposed surface of the said second scale means or to view an image of the surface of the said first scale means;

(i) said video sensor means generating a fifth signal indicative of the image said video sensor means is currently viewing;

(j) first user display means mounted in said first stationary structural member;

(k) a second stationary structural member intended for supervisory use by a supervisory employee;

(l) second user display means mounted in said second stationary structural member where said second user display means receives said fifth signal and said second user display means displays an image corresponding to said fifth signal;

(m) second user input means mounted in said second stationary structural member generating a sixth signal indicative of the particular second user input means device selected; (n) controller means receiving via data communications means said first, second, third, fourth and sixth signals;

(o) said controller means sending a first controller signal to said first user display means where said first user display means displays an image corresponding to said first controller signal;

(p) said controller means sending a second controller signal to a third user display means where said third user display means displays an image corresponding to said second controller signal and where said third user display means is mounted in the said second stationary structural member;

(q) said controller means sending a third controller signal to said video sensor movement means where said video sensor movement means moves the said video sensor means corresponding to the said third controller signal;

(r) product lookup table means attached to said controller means;

(s) said controller means upon receiving the first signal from said bar code reader means, sending a signal indicative of the first signal to said product lookup table and receiving in return a stored weight signal from said product lookup table indicative of the weight of the product whose bar code has just been read by said bar code reader means where said controller means compares the said stored weight signal with the increase in the second signal, indicative of the increase in weight on the said first scale means, being received from the said first scale means and where there is no valid correspondence between said stored weight signal and the increase in the second signal, said controller means sends a first controller signal to said first user display means advising the user of the lack of such valid correspondence; and (t) said controller means upon receiving the third signal from the said first user input means indicative of a product without a valid bar code, sending a third controller signal to said video sensor movement means such that said video sensor movement means moves the said video sensor means such that the said video sensor means views the surface of the said second scale means and thus the image of the surface of the said second scale means is indicated by the fifth signal and is thus displayed on the said second user display means, and sending a second controller signal to the said third user display means, and upon receiving a valid sixth signal from the said second user input means sends a first controller signal to said first user display means advising the user to transfer the contents on the said second scale means to the said first scale means and then verifies that the increase in weight indicated by the increase in the second signal is equal to the previous value of the fourth signal indicating the weight previously on the said second scale means.

2. The self-service checkout system of claim 1 wherein a third scale means is mounted in the said first stationary structural member and generates a third scale signal indicative of the weight on said third scale means and where said controller means surveys said third scale signal for stability except when the said controller means receives a third signal indicative of a first user input means selected for bag transfer from said first scale means to said third scale means where said controller means compares the decrease in the second signal with the increase in the third scale signal and where said comparison is not valid sends a first controller signal to the said first user display means so as to advise the user as to the lack of valid comparison.

3. The self-service checkout system of claim 1 wherein a first microphone means generating a first microphone signal is mounted in said first stationary structural member and a second microphone means generating a second microphone signal is mounted in said second stationary structural member and a first speaker means receiving said second microphone signal is mounted in said first stationary structural member and a second speaker means receiving said first microphone signal is mounted in said second stationary structural member.

4. The self-service checkout system of claim 1 wherein a receipt printer means is mounted within the said first stationary structural member and where said receipt printer means receives a printer signal from the said controller means.

5. The self-service checkout system of claim 1 wherein said controller means sends a voice signal to a human voice generating means.

6. The self-service checkout system of claim 1 wherein magnetic payment card reader means is mounted in the said first stationary structural member and where said magnetic payment card reader means generates a payment signal which is received by said controller means.

7. The self-service checkout system of claim 1 wherein coupon acceptor means is mounted in the said first stationary structural member and where said coupon acceptor means generates a coupon signal which is received by said controller means.

8. The self-service checkout system of claim 1 wherein a modem means is attached through a data communication means with said controller means.

9. The self-service checkout system of claim 1 wherein cash drawer means is mounted in said second stationary structural member and where said cash drawer receives a latch signal from said controller means.

10. The self-service checkout system of claim 1 wherein all exposed surfaces of said first stationary structural member are angled away from the horizontal direction.

11. The self-service checkout system of claim 1 wherein said second user display means and said third user display means are replaced by a single fourth user display means where said fourth user display means receives said fifth signal and receives said second controller signal and where said fourth user display means displays simultaneously the images indicated by said fifth signal and said second controller signal.

12. The self-service checkout system of claim 1 wherein said second user display means receives the fifth signal through a first switching means capable of connecting at different times the single second user display means with a plurality of video sensor means associated with a plurality of first stationary structural members and where said second user input means sends a sixth signal through a second switching means capable of connecting at different times the single second user input means with a plurality of controller means associated with a plurality of first stationary structural members and where said third user display means receives the second controller signal through a third switching means capable of connecting at different times the single third user display means with a plurality of controller means associated with a plurality of first stationary structural members.

13. The self-service checkout system of claim 12 wherein a second controller means sends a switch signal to said first, second and third switching means where said switch signal is indicative of a particular first stationary structural member and where said first, second and third switching means in response connect the said devices of the said second stationary structural member with the corresponding said devices of the said particular first stationary structural member.

14. The self-service checkout system of claim 12 wherein the said controller means of one particular of a plurality of first stationary structural members sends a switch signal to said first, second and third switching means where said switch signal is indicative of said particular first stationary structural member and where said first, second and third switching means in response connect the said devices of the said second stationary structural member with the corresponding said devices of the said particular first stationary structural member.

15. A self-service checkout system comprising:
(a) a first stationary structural member intended for checkout use by a customer;
(b) bar code reader means and first scale means mounted in said first stationary structural member such that said bar code reader means does not make contact with the active elements of said first scale means but that said bar code reader means is mounted less than one meter away from said first scale means;
(c) said bar code reader means generating a first signal indicative of the product code of a product whose bar coded label has been read by said bar code reader means;
(d) bag holding means mounted upon said first scale means;
(e) said first scale means generating a second signal indicative of the weight present on said first scale means;
(f) first user input means mounted in said first stationary structural member generating a third signal indicative of the particular first user input means device selected;
(g) second scale means mounted in said first stationary structural member such that the top exposed surface of said second scale means defines an area where customers will temporarily deposit products without valid bar coded labels and where said second scale means generates a fourth signal indicative of the weight thereon;
(h) first video sensor means mounted above said first scale means where said first video sensor means views the products placed on the said first scale means and a second video sensor means mounted so that there is a direct visually unobstructed line from the said second video sensor means to the top exposed surface of the said second scale means where said second video sensor means views the products placed on the top exposed surface of said second scale means;
(i) the output signals of said first video sensor means and said second video sensor means connected by signal communication means to a video switching means where said video switching means is selectively operable for transmitting a fifth signal indicative of the output signal of said first video sensor means or the output signal of said second video sensor means;
(j) first user display means mounted in said first stationary structural member;
(k) a second stationary structural member intended for supervisory use by a supervisory employee;

(l) second user display means mounted in said second stationary structural member where said second user display means receives said fifth signal and said second user display means displays an image corresponding to said fifth signal;

(m) second user input means mounted in said second stationary structural member generating a sixth signal indicative of the particular second user input means device selected;

(n) controller means receiving via data communications means said first, second, third, fourth and sixth signals;

(o) said controller means sending a first controller signal to said first user display means where said first user display means displays an image corresponding to said first controller signal;

(p) said controller means sending a second controller signal to a third user display means where said third user display means displays an image corresponding to said second controller signal and where said third user display means is mounted in the said second stationary structural member;

(q) said controller means sending a third controller signal to said video switching means where said video switching means transmits as indicated by the said third controller signal as the said fifth signal the output signal of the said first video sensor means or the output signal of the said second video sensor means;

(r) product lookup table means attached to said controller means;

(s) said controller means upon receiving the first signal from said bar code reader means, sending a signal indicative of the first signal to said product lookup table and receiving in return a stored weight signal from said product lookup table indicative of the weight of the product whose bar code has just been read by said bar code reader means where said controller means compares the said stored weight signal with the increase in the second signal, indicative of the increase in weight on the said first scale means, being received from the said first scale means and where there is no valid corresponding between said stored weight signal and the increase in the second signal, said controller means sends a first controller signal to said first user display means advising the user of the lack of such valid correspondence; and (t) said controller means upon receiving the third signal from the said first user input means indicative of a product without a valid bar code, sending a third controller signal to said video switching means such that said fifth signal is indicative of the image of the surface of the said second scale means and is thus displayed on the said second user display means, and sending a second controller signal to the said third user display means, and upon receiving a valid sixth signal from the said second user input means sends a first controller signal to said first user display means advising the user to transfer the contents on the said second scale means to the said first scale means and then verifies that the increase in weight indicated by the increase in the second signal is equal to the previous value of the fourth signal indicating the weight previously on the said second scale means.

16. The self-service checkout system of claim 15 wherein a plurality of said self-service checkout stations are selectively connected to a singular supervisor station by switching means.

17. The self-service checkout system of claim 15 wherein said controller means upon receiving a signal from said product lookup table indicative of the current product requiring video approval, sending a third controller signal to said video switching means such that said fifth signal is indicative of the image of the surface of the said second scale means and is thus displayed on the said second user display means, and sending a second controller signal to the said third user display means, and upon receiving a valid sixth signal from the said second user input means sends a first controller signal to said first user display means advising the user to transfer the contents on the said second scale means to the said first scale means and then verifies that the increase in weight indicated by the increase in the second signal is equal to the previous value of the fourth signal indicating the weight previously on the said second scale means.

* * * * *